United States Patent
Mochizuki

(10) Patent No.: US 12,122,209 B2
(45) Date of Patent: Oct. 22, 2024

(54) SHOCK ABSORBER WITH VEHICLE HEIGHT ADJUSTMENT FUNCTION

(71) Applicant: KYB Corporation, Tokyo (JP)

(72) Inventor: Takahisa Mochizuki, Tokyo (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 18/560,050

(22) PCT Filed: Jul. 26, 2021

(86) PCT No.: PCT/JP2021/027556
§ 371 (c)(1),
(2) Date: Nov. 9, 2023

(87) PCT Pub. No.: WO2023/007550
PCT Pub. Date: Feb. 2, 2023

(65) Prior Publication Data
US 2024/0227488 A1    Jul. 11, 2024

(51) Int. Cl.
*B60G 17/08* (2006.01)
*B60G 15/06* (2006.01)
(Continued)

(52) U.S. Cl.
CPC ........... *B60G 17/08* (2013.01); *B60G 15/062* (2013.01); *B60G 17/0565* (2013.01);
(Continued)

(58) Field of Classification Search
CPC ................ B60G 17/08; B60G 17/0565; B60G 17/0525; B60G 15/06; B60G 15/062;
(Continued)

(56) References Cited

U.S. PATENT DOCUMENTS

| 5,682,980 | A | 11/1997 | Reybrouck |
| 8,672,337 | B2 * | 3/2014 | van der Knaap .. B60G 17/0152 |
| | | | 280/124.16 |

(Continued)

FOREIGN PATENT DOCUMENTS

| JP | S61-057416 A | 3/1986 |
| JP | S63-085508 U | 6/1988 |

(Continued)

*Primary Examiner* — Keith J Frisby
(74) *Attorney, Agent, or Firm* — Paratus Law Group, PLLC

(57) ABSTRACT

A shock absorber with a vehicle height adjustment function according to the present invention includes a shock absorber main body that includes a cylinder filled with liquid, a piston that partitions inside of the cylinder into an extension side chamber and a compression side chamber, a piston rod coupled to the piston, a suspension spring that biases the shock absorber main body in an extending direction, a reservoir that accumulates liquid, a damper circuit that is connected to the extension side chamber, the compression side chamber, and the reservoir and generates a damping force in the shock absorber main body at the time when the shock absorber main body expands/contracts, a pump that is able to suck liquid from the reservoir and discharge the liquid, and a switching valve that is installed between the shock absorber main body and the damper circuit and the pump and switches a damper mode in which the shock absorber main body is connected to the damper circuit so as to generate a damping force in the shock absorber main body and a vehicle height adjustment mode in which the shock absorber main body is connected to the pump.

9 Claims, 9 Drawing Sheets

(51) Int. Cl.
  *B60G 17/056*   (2006.01)
  *B62K 25/04*    (2006.01)
(52) U.S. Cl.
  CPC .... *B60G 2202/312* (2013.01); *B60G 2300/12* (2013.01); *B60G 2500/30* (2013.01); *B60G 2800/914* (2013.01); *B62K 2025/045* (2013.01)
(58) Field of Classification Search
  CPC ........ B60G 2202/312; B60G 2202/413; B60G 2300/12; B60G 2500/30; B60G 2800/914; B62K 2025/045; F16F 9/56
  USPC .......................................... 280/6.157, 5.514
  See application file for complete search history.

(56) References Cited

U.S. PATENT DOCUMENTS

| 11,325,439 | B2* | 5/2022 | Dietrich | F16F 1/121 |
| 2016/0319897 | A1 | 11/2016 | Mochizuki et al. | |
| 2017/0057591 | A1* | 3/2017 | Bender | B62K 25/283 |
| 2021/0323370 | A1* | 10/2021 | Brandstetter | B60G 17/0272 |

FOREIGN PATENT DOCUMENTS

| JP | H05162525 A * | 6/1993 |
| JP | H09-226341 A | 9/1997 |
| JP | 2007-161179 A | 6/2007 |
| JP | 2015-117812 A | 6/2015 |
| JP | 2020-159504 A | 10/2020 |

\* cited by examiner

SHOCK ABSORBER WITH VEHICLE HEIGHT ADJUSTMENT FUNCTION

CROSS REFERENCE TO PRIOR APPLICATION

This application is a National Stage Patent Application of PCT International Patent Application No. PCT/JP2021/027556 (filed on Jul. 26, 2021) under 35 U.S.C. § 371, which is hereby incorporated by reference in its entirety.

TECHNICAL FIELD

The present invention relates to a shock absorber with a vehicle height adjustment function.

BACKGROUND ART

As this type of shock absorber with a vehicle height adjustment function, for example, as disclosed in JP2015-117812A, there is a shock absorber that includes a shock absorber main body that includes an outer shell and a piston rod movably inserted into the outer shell in the axial direction and generates a damping force at the time of relative movement of the piston rod with respect to the outer shell, an annular spring seat slidably attached to an outer periphery of the outer shell, a rod-side spring seat attached to a front end of the piston rod, a suspension spring that is interposed between the spring seat and the rod-side spring seat and biases the shock absorber main body in an extending direction, and a vehicle height adjustment device that is attached to the outer periphery of the outer shell and drives the spring seat in the axial direction and is interposed between a vehicle body of a motorcycle and a swing arm.

The vehicle height adjustment device specifically includes a hydraulic jack that is attached to the outer periphery of the outer shell and drives the spring seat to the axial direction, a pump that supplies and discharges pressure oil to and from the hydraulic jack via a hose, and a tank that accumulates hydraulic oil.

Then, when operating the pump and discharging the pressure oil from a jack chamber in the hydraulic jack to the tank, the hydraulic jack contracts, and the vehicle height adjustment device moves the spring seat to an opposite piston rod side along the outer periphery of the outer shell. Furthermore, when operating the pump and supplying the pressure oil from the tank into the jack chamber, the hydraulic jack extends, and the vehicle height adjustment device moves the spring seat to the piston rod side along the outer periphery of the outer shell.

Therefore, since the shock absorber with the vehicle height adjustment function may change the position of the spring seat with respect to the outer shell by driving the hydraulic jack and adjust the vehicle height of the motorcycle, it is possible to improve footability of a passenger by lowering the vehicle height at the time when the motorcycle is stopped.

CITATION LIST

Patent Literature

Patent Literature 1: JP 2015-117812 A

SUMMARY OF INVENTION

Technical Problem

As described above, the typical shock absorber with the vehicle height adjustment function adjusts the vehicle height by the vehicle height adjustment device attached to the outer periphery of the outer shell of the shock absorber main body, and the shock absorber main body includes a separated reservoir, and the vehicle height adjustment device includes the hydraulic jack and the tank. Therefore, the entire size of the shock absorber is large, and there is a problem in mountability on a vehicle.

Therefore, an object of the present invention is to provide a small shock absorber with a vehicle height adjustment function even if the shock absorber has the vehicle height adjustment function.

Solution to Problem

To achieve the above object, a shock absorber with a vehicle height adjustment function in means for solving a problem in the present invention includes a shock absorber main body that includes a cylinder filled with liquid, a piston that is movably inserted into the cylinder and partitions inside of the cylinder into an extension side chamber and a compression side chamber, and a piston rod that is movably inserted into the cylinder and is coupled to the piston, a suspension spring that biases the shock absorber main body in an extending direction, a reservoir that accumulates liquid, a damper circuit that is connected to the extension side chamber, the compression side chamber, and the reservoir and generates a damping force in the shock absorber main body at the time when the shock absorber main body expands/contracts, a pump that is able to suck liquid from the reservoir and discharge the liquid, and a switching valve that is installed between the shock absorber main body and the damper circuit and the pump and is able to switch a damper mode in which the shock absorber main body is connected to the damper circuit so as to generate a damping force in the shock absorber main body and a vehicle height adjustment mode in which the shock absorber main body is connected to the pump.

According to the shock absorber with the vehicle height adjustment function configured in this way, the damper circuit and the pump can be selectively enabled by the switching valve. Therefore, the reservoir used to supply and discharge liquid that is excessive or insufficient in the cylinder when the shock absorber main body generates a damping force can be used as a tank that accumulates liquid to be supplied into the shock absorber main body at the time when the vehicle height is adjusted. Furthermore, according to the shock absorber with the vehicle height adjustment function configured in this way, since liquid is supplied into the shock absorber main body by driving the pump and the shock absorber main body can be extended or contracted or expanded/contracted, it is not necessary to provide a jack for driving a spring seat of the suspension spring. Therefore, according to the shock absorber with the vehicle height adjustment function, it is possible to miniaturize the shock absorber even if the shock absorber has the vehicle height adjustment function.

DESCRIPTION OF EMBODIMENTS

Figure 1:
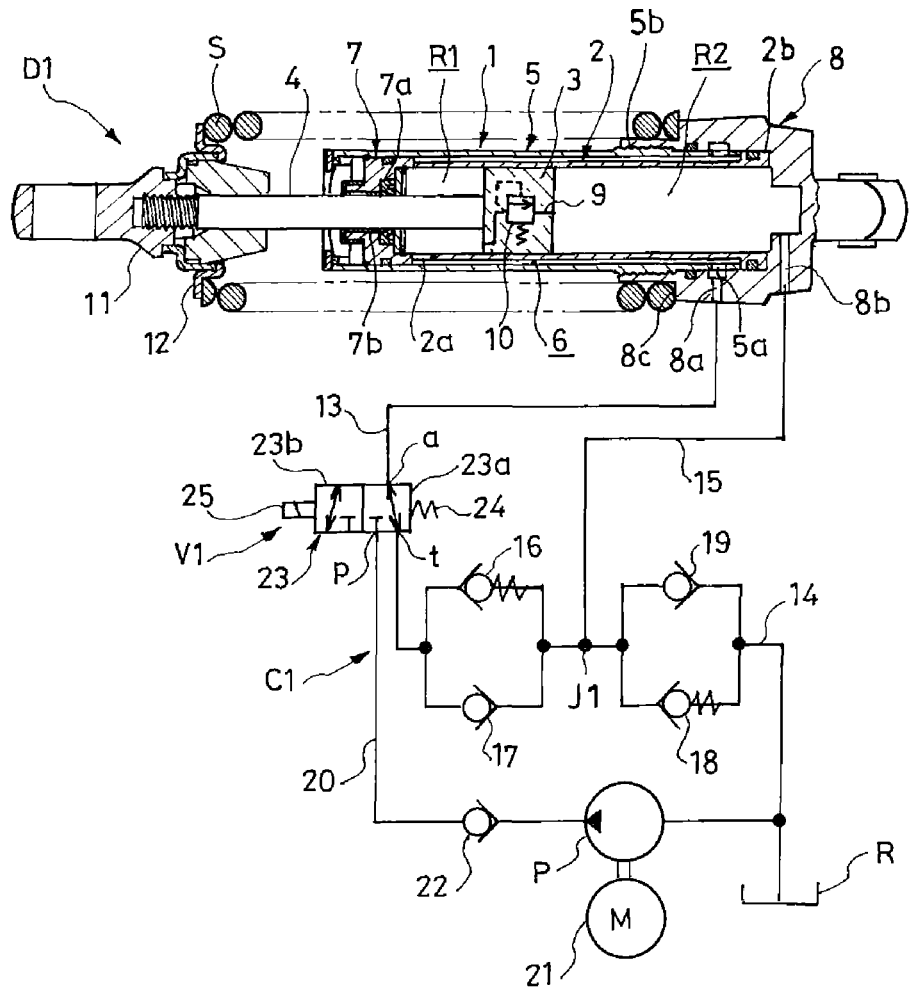
FIG. 1 is a diagram illustrating a shock absorber with a vehicle height adjustment function according to a first embodiment.

Hereinafter, the present invention will be described based on each embodiment illustrated in the drawings. In a shock absorber with a vehicle height adjustment function according to each embodiment, a member or a component denoted with a common reference numeral has the same configuration. Therefore, in order to avoid duplication of description, detailed description of the configuration described in detail in description of a shock absorber with a vehicle height adjustment function according to one embodiment is omitted in description of a shock absorber with a vehicle height adjustment function according to another embodiment.

First Embodiment

As illustrated in FIG. 1, a shock absorber D1 with a vehicle height adjustment function according to a first embodiment includes a shock absorber main body 1, a suspension spring S that biases the shock absorber main body 1 in an extending direction, a reservoir R that accumulates liquid, a damper circuit C1, a pump P, and a switching valve V1 and is used by being interposed between a vehicle body and a vehicle axis of a vehicle (not illustrated). Note that a vehicle in which a shock absorber with a vehicle height adjustment function is used, according to each embodiment is not limited to motorcycles and may be automobiles and other vehicles.

First, the shock absorber main body 1 will be described. The shock absorber main body 1 according to the present embodiment includes a cylinder 2 filled with liquid, a piston 3 that is movably inserted into the cylinder 2 and partitions inside of the cylinder 2 into an extension side chamber R1 and a compression side chamber R2, a piston rod 4 that is movably inserted into the cylinder 2 and is coupled to the piston 3, and a cylindrical outer shell 5 that forms an annular gap 6 that is communicated with the extension side chamber R1 between the outer shell 5 and the cylinder 2 and covers the outer periphery of the cylinder 2.

The cylinder 2 has a cylindrical shape, and in the cylinder 2, the piston 3 is movably inserted into the cylinder 2 in the axial direction as described above, and the extension side chamber R1 on the left side in FIG. 1 of the piston 3 and the compression side chamber R2 on the right side in FIG. 1 are partitioned. Each of the extension side chamber R1 and the compression side chamber R2 is filled with hydraulic liquid, specifically, for example, hydraulic oil. Note that, as the hydraulic liquid, for example, liquid such as water or a water solution may be used, in addition to the hydraulic oil. A flange 2b is provided at the right end of the cylinder 2 in FIG. 1.

Furthermore, in the cylinder 2, the piston rod 4 coupled to the piston 3 is movably inserted in the axial direction. Moreover, the cylinder 2 is contained in the cylindrical outer shell 5 disposed on the outer periphery side, and the annular gap 6 is formed between the cylinder 2 and the outer shell 5.

An annular rod guide 7 is attached to a head end that is the left end in FIG. 1, of the cylinder 2 and the outer shell 5, and the piston rod 4 is projected to the outside of the cylinder 2 through an inner periphery of the rod guide 7. The rod guide 7 includes a seal ring 7a that is slidably in contact with an outer periphery of the piston rod 4 and a cylindrical bush 7b that is slidably in contact with the outer periphery of the piston rod 4, and guides movement of the piston rod 4 in the axial direction with respect to the cylinder 2 while sealing the outer periphery of the piston rod 4.

Furthermore, at a bottom end that is the right end in FIG. 1 of the cylinder 2 and the outer shell 5, a cap 8 that closes the bottom end of the cylinder 2 and the outer shell 5 is attached. Then, opening portions at both ends of the cylinder 2 and the outer shell 5 are closed by the rod guide 7 and the cap 8, and both ends of the annular gaps 6 in the cylinder 2 and between the cylinder 2 and the outer shell 5 are closed.

The cap 8 has a bottomed cylindrical shape, and an outer periphery of the flange 2b of the cylinder 2 is fitted into an inner periphery. Furthermore, a screw portion 5b provided on the outer periphery of the outer shell 5 is screwed to the inner periphery of the cap 8, the flange 2b of the cylinder 2 is sandwiched between the outer shell 5 and the bottom portion of the cap 8, and the cylinder 2 is fixed to the cap 8. Note that the above-described structure for fastening the cylinder 2 and the outer shell 5 to the cap 8 is an example, and another fastening structure may be adopted. Furthermore, in the cap 8, a port 8a that opens from the side and communicates with the annular gap 6 and a port 8b that similarly opens from the side and communicates with the compression side chamber R2 are provided. Each of the ports 8a and 8b is connected to the damper circuit C1. Then, in the vicinity of the head end of the cylinder 2, a hole 2a that communicates the extension side chamber R1 with the annular gap 6 is provided. Therefore, the extension side chamber R1 is connected to the damper circuit C1 via the annular gap 6 and the port 8a, and the compression side chamber R2 is connected to the damper circuit C1 via the port 8b. Moreover, the cap 8 includes a bottom-side spring seat 8c including an annular step portion provided on the outer periphery on the cylinder side of the openings of the ports 8a and 8b.

In the piston 3, a relief passage 9 that communicates the extension side chamber R1 with the compression side chamber R2, and a relief valve 10 that opens/closes the relief passage 9 are provided. When a pressure of the extension side chamber R1 exceeds a pressure of the compression side chamber R2 and a differential pressure between both chambers reaches a valve opening pressure, the relief valve 10 opens and allows only a flow of the hydraulic oil from the extension side chamber R1 toward the compression side chamber R2.

At the front end that is the left end in FIG. 1 of the piston rod 4, a bracket 11 used to attach the piston rod 4 to the vehicle is attached, and a head-side spring seat 12 is attached via the bracket 11 so as not to move in the axial direction. Note that the head-side spring seat 12 may be directly attached to the piston rod 4.

Then, the suspension spring S is interposed between the head-side spring seat 12 and the bottom-side spring seat 8c formed in the cap 8. The suspension spring S is interposed between the head-side spring seat 12 and the bottom-side spring seat 8c in a compressed state and constantly biases the piston rod 4 in a direction in which the piston rod 4 is projected outward from the cylinder 2. That is, the suspension spring S biases the shock absorber main body 1 in the extending direction.

In the shock absorber D1 with the vehicle height adjustment function according to the present embodiment, although not illustrated, the inside of the reservoir R is partitioned, with a diaphragm, into a liquid chamber filled with the hydraulic oil and a gas chamber in which gas is enclosed, and is assumed as an accumulator in which the hydraulic oil in the liquid chamber is pressurized with the pressure of the gas in the gas chamber. Note that the reservoir R only needs to accumulate the hydraulic oil and does not need to pressurize the liquid chamber. Furthermore, the partition between the liquid chamber and the gas chamber in the reservoir R may be a free piston, a bellows, or the like, in addition to the diaphragm.

Subsequently, the damper circuit C1 will be described. The damper circuit C1 includes a first passage 13 of which one end is connected to the extension side chamber R1, a second passage 14 that connects another end of the first passage 13 to the reservoir R, a third passage 15 that connects a first connection point J1 that is a connection point between the first passage 13 and the second passage 14 to the compression side chamber R2, a first extension side damping valve 16 that is provided in the first passage 13 and gives a resistance to a flow of the hydraulic oil from the extension side chamber R1 toward the first connection point J1, a first extension side check valve 17 that is provided in the first passage 13 in parallel to the first extension side damping valve and allows only a flow of the hydraulic oil from the first connection point J1 toward the extension side chamber R1, a first compression side damping valve 18 that is provided in the second passage 14 and gives a resistance to a flow of the hydraulic oil from the first connection point J1 toward the reservoir R, and a first compression side check valve 19 that is provided in the second passage 14 in parallel to the first compression side damping valve 18 and allows only a flow of the hydraulic oil from the reservoir R toward the first connection point J1.

As described above, the one end of the first passage 13 is connected to the extension side chamber R1, and the other end is connected to the second passage 14. Moreover, one end of the second passage 14 is connected to the first passage 13, and another end is connected to the reservoir R. In this way, the first passage 13 and the second passage 14 are connected in series, and the extension side chamber R1 is connected to the reservoir R via the first passage 13 and the second passage 14. Furthermore, one end of the third passage 15 is connected to the compression side chamber R2, and another end is connected to the first connection point J1 between the first passage 13 and the second passage 14. Therefore, the extension side chamber R1 is connected to the compression side chamber R2 via the first passage 13 and the third passage 15, and the compression side chamber R2 is connected to the reservoir R via the third passage 15 and the second passage 14.

In the shock absorber D1 with the vehicle height adjustment function according to the present embodiment, the first extension side damping valve 16 is a damping valve that allows only the flow of the hydraulic oil that passes through the first passage 13 from the extension side chamber R1 toward the first connection point J1 and gives a resistance to the flow that is passing and is, for example, a leaf valve, a poppet valve, or the like. Note that the first extension side damping valve 16 may be a valve that allows a bidirectional flow, such as an orifice or a choke. Furthermore, the first extension side check valve 17 is provided in the first passage 13 in parallel to the first extension side damping valve, allows only the flow of the hydraulic oil that passes through the first passage 13 from the first connection point J1 toward the extension side chamber R1, and prevents a reverse flow of the hydraulic oil. Therefore, in a case where the hydraulic oil flows through the first passage 13 from the extension side chamber R1 toward the first connection point J1, the hydraulic oil passes through the first extension side damping valve 16, and conversely, in a case where the hydraulic oil flows through the first passage 13 from the first connection point J1 toward the extension side chamber R1, the hydraulic oil passes through the first extension side check valve 17.

In the shock absorber D1 with the vehicle height adjustment function according to the present embodiment, the first compression side damping valve 18 is a damping valve that allows only the flow of the hydraulic oil that passes through the second passage 14 from the first connection point J1 toward the reservoir R and gives a resistance to the flow of the hydraulic oil that is passing, and is, for example, a leaf valve, a poppet valve, or the like. Note that the first compression side damping valve 18 may be a valve that allows a bidirectional flow, such as an orifice or a choke. Furthermore, the first compression side check valve 19 is provided in the second passage 14 in parallel to the first compression side damping valve 18, allows only the flow of the hydraulic oil that passes through the second passage 14 from the reservoir R toward the first connection point J1, and prevents a reverse flow of the hydraulic oil. Therefore, in a case where the hydraulic oil flows through the second passage 14 from the first connection point J1 toward the reservoir R, the hydraulic oil passes through the first compression side damping valve 18, and conversely, in a case where the hydraulic oil flows through the second passage 14 from the reservoir R toward the first connection point J1, the hydraulic oil passes through the first compression side check valve 19.

Subsequently, one end of the pump P is connected to the reservoir R, and another end is provided in a pump passage 20 communicating with the switching valve V1. The pump P is a one-way pump that sucks the hydraulic oil from the reservoir R when being driven by a motor 21 and discharges the hydraulic oil toward the switching valve V1. Note that the pump P is a gear pump. However, various types of other pumps such as a piston pump or a screw pump may be used. Furthermore, in the pump passage 20, a pump passage check valve 22 that allows only a flow of the hydraulic oil through the pump passage 20 from the pump P toward the switching valve V1 is provided, and a reverse flow of the hydraulic oil from the side of the switching valve V1 toward the pump P is prevented.

The switching valve V1 is a three-port two-position solenoid switching valve including three ports a, t, and p, connects the ports a and t to partway in the first passage 13, is provided on the side of the extension side chamber than the first extension side damping valve 16 and the first extension side check valve 17, and connects the port p to another end of the pump passage 20. Specifically, the switching valve V1 includes a valve body 23 having a first position 23a where the ports a and t are connected so as to communicate the first passage 13 and the port p is closed so as to block the other end of the pump passage 20 and a second position 23b where the port t is closed so as to block the first passage 13 and the ports a and p are connected so as to communicate between the pump passage 20 and the extension side chamber R1, a spring 24 that biases the valve body 23 so as to take the first position 23a, and a solenoid 25 that switches the valve body 23 to the second position 23b against the biases of the spring 24 at the time of energization. Therefore, in a case where the switching valve V1 takes the first position 23a without energizing the solenoid 25, the pump passage 20 is blocked, and the shock absorber main body 1 is connected to the damper circuit C1 via the first passage 13, and this enables the damper circuit C1. Accordingly, the shock absorber D1 with the vehicle height adjustment function is in a damper mode. On the other hand, in a case where the solenoid 25 is energized and the switching valve V1 takes the second position 23b, the first passage 13 is blocked, and the pump passage 20 is connected to the extension side chamber R1, and the pump P is enabled. Accordingly, the shock absorber D1 with the vehicle height adjustment function is in a vehicle height adjustment mode. In this way, the switching valve V1 can select one of the damper mode in which only the damper circuit C1 is enabled and the vehicle height adjustment mode in which the pump P is enabled, and can switch the mode of the shock absorber D1 with the vehicle height adjustment function.

The shock absorber D1 with the vehicle height adjustment function according to the first embodiment is configured as described above, and an operation will be described below. First, an operation in a case where the switching valve V1 selects the first position 23a and the shock absorber D1 with the vehicle height adjustment function is in the damper mode will be described.

In the damper mode, with the switching valve V1, the extension side chamber R1 is connected to the damper circuit C1 via the first passage 13 and is connected to the compression side chamber R2 and the reservoir R via the damper circuit C1, and the pump passage 20 is blocked, and the connection between the extension side chamber R1 and the pump P is disconnected.

Then, when the shock absorber main body 1 is extended by an external force, the piston 3 moves leftward in FIG. 1 in the cylinder 2 so as to compress the extension side chamber R1 and expand the compression side chamber R2. The hydraulic oil pushed out from the extension side chamber R1 along with the movement of the piston 3 passes through the first extension side damping valve 16 of the first passage 13 and moves to the compression side chamber R2 that is expanded, via the third passage 15. At the time of extension operation of the shock absorber main body 1, the piston rod 4 exits from the inside of the cylinder 2. Therefore, an amount of the hydraulic oil that moves from the extension side chamber R1 to the compression side chamber R2 cannot cover an expanded volume of the compression side chamber R2, and the hydraulic oil corresponding to the volume of the piston rod 4 that has exited from the inside of the cylinder 2 becomes insufficient in the compression side chamber R2. The insufficient amount of the hydraulic oil passes through the first compression side check valve 19 of the second passage 14 from the reservoir R and is supplied to the compression side chamber R2 via the third passage 15. When the shock absorber main body 1 performs the extension operation, as described above, since the first extension side damping valve 16 gives a resistance to the flow of the hydraulic oil that moves from the extension side chamber R1 to the compression side chamber R2, the pressure in the compression side chamber R2 is substantially equal to the pressure in the reservoir R, while the pressure in the extension side chamber R1 increases. Therefore, the shock absorber D1 with the vehicle height adjustment function generates an extension side damping force that prevents the extension of the shock absorber main body 1.

When the shock absorber main body 1 contracts by the external force, the piston 3 moves rightward in FIG. 1 in the cylinder 2 so as to compress the compression side chamber R2 and expand the extension side chamber R1. The hydraulic oil pushed out from the compression side chamber R2 along with the movement of the piston 3 passes through the third passage 15 and the first extension side check valve 17 of the first passage 13 and moves to the extension side chamber R1 that is expanded. As the time of a contraction operation of the shock absorber main body 1, the piston rod 4 enters the cylinder 2. Therefore, an amount of the hydraulic oil pushed out from the compression side chamber R2 is excessively larger than the expanded volume of the extension side chamber R1 by a volume of the piston rod 4 entering the cylinder 2. After passing through the third passage 15 from the compression side chamber R2, the excessive hydraulic oil is discharged to the reservoir R via the first compression side damping valve 18 of the second passage 14. When the shock absorber main body 1 performs the contraction operation, as described above, since the first compression side damping valve 18 gives a resistance to the flow of the hydraulic oil that moves from the compression side chamber R2 to the reservoir R, the pressure in the extension side chamber R1 and the pressure in the compression side chamber R2 increase to be substantially equal to each other. Since a pressure receiving area of the piston 3 that receives the pressure of the compression side chamber R2 is larger than a pressure receiving area of the piston 3 that receives the pressure of the extension side chamber R1 by a cross-sectional area of the piston rod 4, the shock absorber D1 with the vehicle height adjustment function generates a compression side damping force that prevents the contraction of the shock absorber main body 1.

Therefore, in a case where the shock absorber D1 with the vehicle height adjustment function is in the damper mode, if the shock absorber main body 1 is expanded/contracted by the external force, the shock absorber D1 with the vehicle height adjustment function generates the damping force that prevents the expansion/contraction of the shock absorber main body 1.

Subsequently, an operation in a case where the switching valve V1 selects the second position 23b and the shock absorber D1 with the vehicle height adjustment function is in the vehicle height adjustment mode will be described. When the switching valve V1 takes the second position 23b, the pump passage 20 is connected to the extension side chamber R1, the first passage 13 is blocked, and the hydraulic oil does not flow in a portion from the switching valve V1 to the first connection point J1 in the first passage 13.

In this state, if the pump P is driven by the motor 21 and the hydraulic oil is supplied from the reservoir R to the extension side chamber R1, the hydraulic oil pushes the piston 3 rightward in FIG. 1, and the shock absorber main body 1 performs the contraction operation. Along with the contraction operation of the shock absorber main body 1, the extension side chamber R1 is expanded, the compression side chamber R2 is compressed, and the hydraulic oil is pushed out from the compression side chamber R2. The pushed hydraulic oil passes through the third passage 15 and the first compression side damping valve 18 of the second passage 14 and is discharged to the reservoir R.

Therefore, in a case where the shock absorber D1 with the vehicle height adjustment function is in the vehicle height adjustment mode, by driving the pump P, the shock absorber D1 with the vehicle height adjustment function may compress the suspension spring S, contracts the shock absorber main body 1, and lower the height of the vehicle. Since a resilient force of the suspension spring S increases by only an amount by which the suspension spring S is compressed and the shock absorber main body 1 is biased in the extending direction, the pressure in the extension side chamber R1 increases. Note that, even if the driving of the pump P is stopped, the pump passage check valve 22 is provided in the pump passage 20 and the hydraulic oil in the extension side chamber R1 cannot move. Therefore, the shock absorber main body 1 is maintained to be in a contracted state, and the vehicle height is maintained to be in a lowered state. Furthermore, the shock absorber D1 with the vehicle height adjustment function can adjust a contraction amount of the shock absorber main body 1 according to an amount of the hydraulic oil supplied from the pump P. If a stroke sensor that detects an expansion/contraction displacement of the shock absorber main body 1 is provided, the contraction amount of the shock absorber main body 1 can be recognized. Therefore, if the motor 21 is controlled while monitoring the contraction amount of the shock absorber main body 1 using the stroke sensor, the contraction amount of the shock absorber main body 1 can be adjusted to a predetermined contraction amount. Furthermore, for example, in a case where a passenger of the vehicle can perform an operation to energize the motor 21, the passenger can adjust the height by driving the pump P until the vehicle height reaches a desired height.

Note that, when the external force for extending the shock absorber main body 1 acts and the pressure in the extension side chamber R1 reaches a preset upper limit pressure in a state where the shock absorber D1 with the vehicle height adjustment function is in the vehicle height adjustment mode and the shock absorber main body 1 contracts, the relief valve 10 opens, and the hydraulic oil can move from the inside of the extension side chamber R1 to the compression side chamber R2. Therefore, even if a situation occurs where the passenger makes the vehicle travel and the shock absorber main body 1 extends, in a state where the shock absorber D1 with the vehicle height adjustment function is in the vehicle height adjustment mode, the pressure in the extension side chamber R1 does not become excessive, and the shock absorber D1 with the vehicle height adjustment function is protected.

Then, after lowering the vehicle height by setting the shock absorber D1 with the vehicle height adjustment mode to be in the vehicle height adjustment mode, the switching valve V1 is switched from the second position 23b to the first position 23a, and the mode of the shock absorber D1 with the vehicle height adjustment function is changed to the damper mode. Then, the extension side chamber R1 is connected to the damper circuit C1 via the first passage 13, the pump passage 20 is blocked, and the connection between the pump P and the extension side chamber R1 is disconnected. Then, since the suspension spring S compressed by lowering the vehicle height extends the shock absorber main body 1, the hydraulic oil is pushed out from the extension side chamber R1, passes through the first extension side damping valve 16 and the third passage 15, and moves to the compression side chamber R2, and the hydraulic oil of an amount corresponding to the volume of the piston rod 4 that exits from the cylinder 2 moves from the reservoir R to the compression side chamber R2 via the first compression side check valve 19 and the third passage 15. Since the suspension spring S extends until a resilient force of the suspension spring S is balanced with a load received from a vehicle body of the vehicle, the shock absorber main body 1 returns from a state where the vehicle height is lowered to a state before the vehicle height is lowered. Therefore, when the mode is switched from the vehicle height adjustment mode to the damper mode, the shock absorber D1 with the vehicle height adjustment function can return to a state before the vehicle height adjustment using the resilient force of the suspension spring S. Furthermore, since the first extension side damping valve 16 gives a resistance to the flow of the hydraulic oil when the state where the shock absorber main body 1 is contracted returns to an original state, an extension speed of the shock absorber main body 1 becomes moderately slow, and it is not necessary to make the passenger feel uncomfortable.

As described above, in a case where the shock absorber D1 with the vehicle height adjustment function is in the vehicle height adjustment mode, the vehicle height is lowered by driving the pump P. However, in a case where it is desired to increase the vehicle height in the vehicle height adjustment mode, it is sufficient to configure the shock absorber D1 as a shock absorber D2 with a vehicle height adjustment function according to a first modification of the first embodiment illustrated in FIG. 2.

An installation position of the switching valve V1 of the shock absorber D2 with the vehicle height adjustment function according to the first modification of the first embodiment is different from that of the shock absorber D1 with the vehicle height adjustment function according to the first embodiment.

In the shock absorber D1 with the vehicle height adjustment function, the switching valve V1 is provided partway in the first passage 13 and the connection between the extension side chamber R1 and the damper circuit C1 and the connection between the extension side chamber R1 and the pump passage 20 are selectively switched by switching the switching valve V1. However, in a case where it is desired to increase the vehicle height in the vehicle height adjustment mode, as the shock absorber D2 with the vehicle height adjustment function, it is sufficient that the switching valve V1 be provided partway in the third passage 15 and the connection between the compression side chamber R2 and the damper circuit C1 and the connection between the compression side chamber R2 and the pump passage 20 be selectively switched by switching the switching valve V1.

Figure 2:
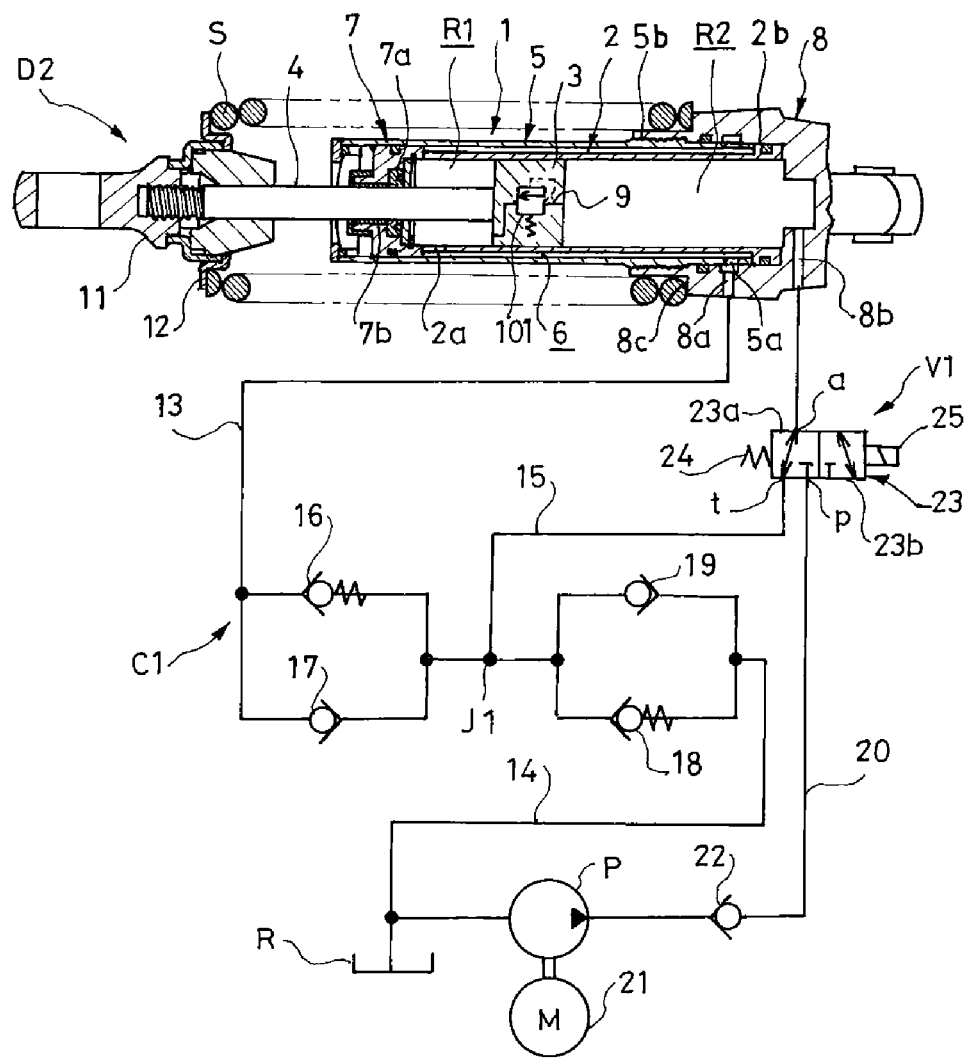
FIG. 2 is a diagram illustrating a shock absorber with a vehicle height adjustment function according to a first modification of the first embodiment.

Specifically, as illustrated in FIG. 2, it is sufficient that the ports a and t of the switching valve V1 be connected to the partway in the third passage 15 and the port p of the switching valve V1 be connected to the other end of the pump passage 20. That is, when taking the first position 23a, the switching valve V1 connects the compression side chamber R2 and the damper circuit C1 by connecting the ports a and t so as to communicate with the third passage 15 and disconnects the connection between the pump P and the compression side chamber R2 by closing the port p. Furthermore, when taking the second position 23b, the switching valve V1 disconnects the connection between the compression side chamber R2 and the damper circuit C1 by closing the port t and blocking the third passage 15 and connects the pump P with the compression side chamber R2 by connecting the ports a and p. Therefore, the switching valve V1 takes the first position 23a without energizing the solenoid 25, the pump passage 20 is blocked, and the shock absorber main body 1 is connected to the damper circuit C1 via the third passage 15, and this enables the damper circuit C1. Accordingly, the shock absorber D2 with the vehicle height adjustment function is in the damper mode. On the other hand, in a case where the solenoid 25 is energized and the switching valve V1 takes the second position 23b, the third passage 15 is blocked, and the pump passage 20 is connected to the compression side chamber R2, and the pump P is enabled. Accordingly, the shock absorber D2 with the vehicle height adjustment function is in the vehicle height adjustment mode. In this way, the switching valve V1 can select one of the damper mode in which only the damper circuit C1 is enabled and the vehicle height adjustment mode in which the pump P is enabled and switch the modes, in the shock absorber D2 with the vehicle height adjustment function according to the first modification of the first embodiment. Note that, in the shock absorber D2 with the vehicle height adjustment function according to the first modification, a relief valve 101 is provided in the relief passage 9 in a direction opposite to that of the shock absorber D1 with the vehicle height adjustment function.

The shock absorber D2 with the vehicle height adjustment function according to the first modification of the first embodiment is configured as described above, and an operation will be described below. First, an operation in a case where the switching valve V1 selects the first position 23a and the shock absorber D1 with the vehicle height adjustment function is in the damper mode will be described.

In the damper mode, with the switching valve V1, while the compression side chamber R2 is connected to the damper circuit C1 via the third passage 15 and is connected to the extension side chamber R1 and the reservoir R via the damper circuit C1, the pump passage 20 is blocked, and the connection between the compression side chamber R2 and the pump P is disconnected.

First, when the shock absorber main body 1 is extended by the external force, the piston 3 moves leftward in FIG. 1 in the cylinder 2 so as to compress the extension side chamber R1 and expand the compression side chamber R2. The hydraulic oil pushed out from the extension side chamber R1 along with the movement of the piston 3 passes through the first extension side damping valve 16 of the first passage 13 and moves to the compression side chamber R2 that is expanded, via the third passage 15. At the time of extension operation of the shock absorber main body 1, the piston rod 4 exits from the inside of the cylinder 2. Therefore, an amount of the hydraulic oil that moves from the extension side chamber R1 to the compression side chamber R2 cannot cover an expanded volume of the compression side chamber R2, and the hydraulic oil corresponding to the volume of the piston rod 4 that has exited from the inside of the cylinder 2 becomes insufficient in the compression side chamber R2. The insufficient amount of the hydraulic oil passes through the first compression side check valve 19 of the second passage 14 from the reservoir R and is supplied to the compression side chamber R2 via the third passage 15. When the shock absorber main body 1 performs the extension operation, as described above, since the first extension side damping valve 16 gives a resistance to the flow of the hydraulic oil that moves from the extension side chamber R1 to the compression side chamber R2, the pressure in the compression side chamber R2 is substantially equal to the pressure in the reservoir R, while the pressure in the extension side chamber R1 increases. Therefore, the shock absorber D2 with the vehicle height adjustment function generates an extension side damping force that prevents the extension of the shock absorber main body 1.

Subsequently, when the shock absorber main body 1 contracts by the external force, the piston 3 moves rightward in FIG. 1 in the cylinder 2 so as to compress the compression side chamber R2 and expand the extension side chamber R1. The hydraulic oil pushed out from the compression side chamber R2 along with the movement of the piston 3 passes through the third passage 15 and the first extension side check valve 17 of the first passage 13 and moves to the extension side chamber R1 that is expanded. As the time of a contraction operation of the shock absorber main body 1, the piston rod 4 enters the cylinder 2. Therefore, an amount of the hydraulic oil pushed out from the compression side chamber R2 is excessively larger than the expanded volume of the extension side chamber R1 by a volume of the piston rod 4 entering the cylinder 2. After passing through the third passage 15 from the compression side chamber R2, the excessive hydraulic oil is discharged to the reservoir R via the first compression side damping valve 18 of the second passage 14. When the shock absorber main body 1 performs the contraction operation, as described above, since the first compression side damping valve 18 gives a resistance to the flow of the hydraulic oil that moves from the compression side chamber R2 to the reservoir R, the pressure in the extension side chamber R1 and the pressure in the compression side chamber R2 increase to be substantially equal to each other. Since a pressure receiving area of the piston 3 that receives the pressure of the compression side chamber R2 is larger than a pressure receiving area of the piston 3 that receives the pressure of the extension side chamber R1 by a cross-sectional area of the piston rod 4, the shock absorber D2 with the vehicle height adjustment function generates a compression side damping force that prevents the contraction of the shock absorber main body 1.

Therefore, in a case where the shock absorber D2 with the vehicle height adjustment function according to the first modification of the first embodiment is in the damper mode, as in the shock absorber D1 with the vehicle height adjustment function according to the first embodiment, if the shock absorber main body 1 is expanded/contracted by the external force, the shock absorber D1 with the vehicle height adjustment function generates a damping force that prevents the expansion/contraction of the shock absorber main body 1.

Subsequently, an operation in a case where the switching valve V1 selects the second position 23b and the shock absorber D2 with the vehicle height adjustment function is in the vehicle height adjustment mode will be described. When the switching valve V1 takes the second position 23b, the pump passage 20 is connected to the compression side chamber R2, the third passage 15 is blocked, and the hydraulic oil does not flow in a portion from the switching valve V1 to the first connection point J1 in the third passage 15.

In this state, if the pump P is driven by the motor 21 and the hydraulic oil is supplied from the reservoir R to the compression side chamber R2, the hydraulic oil pushes the piston 3 rightward in FIG. 2, and the shock absorber main body 1 performs the extension operation. Along with the extension operation of the shock absorber main body 1, the compression side chamber R2 is expanded, the extension side chamber R1 is compressed, and the hydraulic oil is pushed out from the extension side chamber R1. The pushed hydraulic oil passes through the first extension side damping valve 16 of the first passage 13 and the first compression side damping valve 18 of the second passage 14 and is discharged to the reservoir R.

Therefore, in a case where the shock absorber D2 with the vehicle height adjustment function is in the vehicle height adjustment mode, by driving the pump P, the shock absorber D2 with the vehicle height adjustment function may extend the shock absorber main body 1, lift the vehicle body of the vehicle, and increase the vehicle height. Since the suspension spring S also extends along with the extension of the shock absorber main body 1 and the resilient force of the suspension spring S decreases, the shock absorber main body 1 shares and supports the load of the vehicle body, and the pressure in the compression side chamber R2 increases. Note that, even if the driving of the pump P is stopped, the pump passage check valve 22 is provided in the pump passage 20, and the hydraulic oil in the compression side chamber R2 cannot move. Therefore, the shock absorber main body 1 is maintained to be in an extended state, and the vehicle height is maintained to be increased.

Furthermore, the shock absorber D2 with the vehicle height adjustment function can adjust an extension amount of the shock absorber main body 1 according to the amount of the hydraulic oil to be supplied from the pump P. If the stroke sensor that detects an expansion/contraction displacement of the shock absorber main body 1 is provided, the extension amount of the shock absorber main body 1 can be recognized. Therefore, if the motor 21 is controlled while monitoring the extension amount of the shock absorber main body 1 using the stroke sensor, the extension amount of the shock absorber main body 1 can be adjusted to a predetermined extension amount. Furthermore, for example, in a case where a passenger of the vehicle can perform an operation to energize the motor 21, the passenger can adjust the height by driving the pump P until the vehicle height reaches a desired height.

Note that, in the shock absorber D2 with the vehicle height adjustment function, the relief valve 101 is provided that opens and allows the flow of the hydraulic oil from the compression side chamber R2 toward the extension side chamber R1 when the pressure of the compression side chamber R2 exceeds the pressure of the extension side chamber R1 by a predetermined pressure or more. In this way, even if a situation occurs where the passenger makes the vehicle travel and the shock absorber main body 1 contracts in a state where the shock absorber D2 with the vehicle height adjustment function is in the vehicle height adjustment mode, the contraction of the shock absorber main body 1 is allowed, and vibration of the vehicle body can be reduced.

Then, after increasing the vehicle height by setting the shock absorber D2 with the vehicle height adjustment function to be in the vehicle height adjustment mode, the switching valve V1 is switched from the second position 23b to the first position 23a, and the mode of the shock absorber D2 with the vehicle height adjustment function is changed to the damper mode. Then, the compression side chamber R2 is connected to the damper circuit C1 via the third passage 15, the pump passage 20 is blocked, and the connection between the pump P and the compression side chamber R2 is disconnected. Then, since the suspension spring S and the shock absorber main body 1 extended by increasing the vehicle height contract due to the load received from the vehicle body, the hydraulic oil is pushed out from the compression side chamber R2, passes through the first extension side check valve 17, and moves to the extension side chamber R1, and hydraulic oil of an amount corresponding to a volume of the piston rod 4 inserted into the cylinder 2 moves from the compression side chamber R2 to the reservoir R via the third passage 15 and the first compression side damping valve 18. Since the suspension spring S contracts until the resilient force of the suspension spring S is balanced with the load received from the vehicle body of the vehicle, the shock absorber main body 1 returns from a state where the vehicle height is increased to a state before the vehicle height is increased. Therefore, when the mode is switched from the vehicle height adjustment mode to the damper mode, the shock absorber D2 with the vehicle height adjustment function can return to a state before the vehicle height adjustment using the load received from the vehicle body. Furthermore, since the first compression side damping valve 18 gives a resistance to the flow of the hydraulic oil when the state where the shock absorber main body 1 is extended returns to the original state, a contraction speed of the shock absorber main body 1 becomes moderately slow, and it is not necessary to make the passenger feel uncomfortable.

As described above, in a case where the shock absorber D1 with the vehicle height adjustment function is in the vehicle height adjustment mode, the vehicle height is lowered by driving the pump P, and in a case where the shock absorber D2 with the vehicle height adjustment function is in the vehicle height adjustment mode, the vehicle height is increased by driving the pump P. However, in a case where it is desired to increase and lower the vehicle height in the vehicle height adjustment mode, it is sufficient to configure the shock absorber as a shock absorber D3 with a vehicle height adjustment function according to a second modification of the first embodiment illustrated in FIG. 3.

A configuration and an installation position of a switching valve V2 of the shock absorber D3 with the vehicle height adjustment function according to the second modification of the first embodiment are different from those of the shock absorber D1 with the vehicle height adjustment function according to the first embodiment.

In the shock absorber D3 with the vehicle height adjustment function, the switching valve V2 is provided partway in the first passage 13 and the third passage 15, and the connection between the extension side chamber R1 and the compression side chamber R2 and the damper circuit C1, the connection between the extension side chamber R1 and the pump passage 20, and the connection between the compression side chamber R2 and the pump passage 20 is selectively switched by switching the switching valve V2. In the shock absorber D3 with the vehicle height adjustment function, the vehicle height adjustment mode includes two modes including a mode for increasing the vehicle height and a mode for lowering the vehicle height, and it is possible to switch the mode to the mode for increasing the vehicle height and the mode for lowering the vehicle height by switching the switching valve V2, and the damper mode can be selected.

Figure 3:
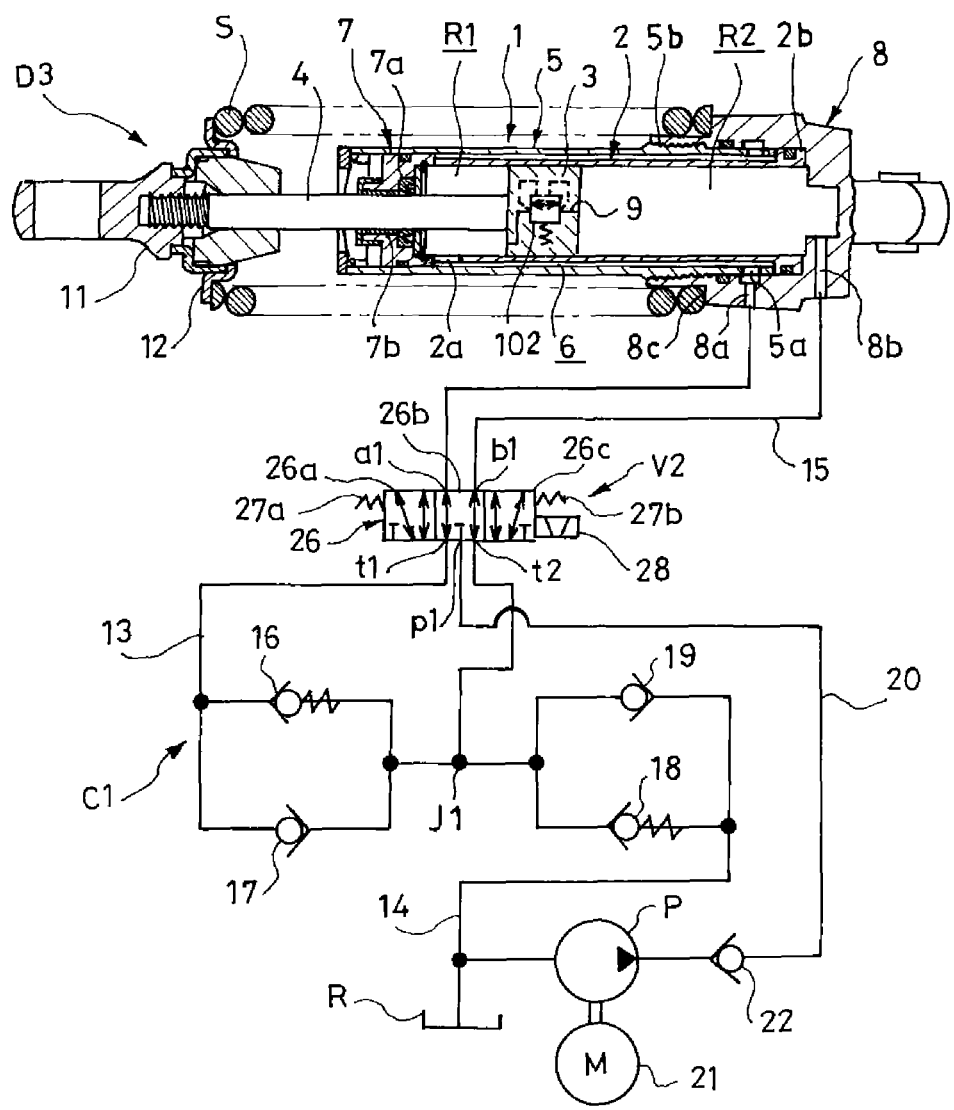
FIG. 3 is a diagram illustrating a shock absorber with a vehicle height adjustment function according to a second modification of the first embodiment.

Specifically, as illustrated in FIG. 3, the switching valve V2 is a five-port three-position solenoid switching valve including five ports a1, b1, t1, t2, and p1 and includes a valve body 26 including a left position 26a, a neutral position 26b, and a right position 26c, springs 27a and 27b that sandwich the valve body 26 and bias the valve body 26 to take the neutral position 26b, and a push-pull type solenoid 28. Furthermore, the switching valve V2 connects the ports a1 and t1 to the partway in the first passage 13, is provided partway in the first passage 13 that is a side of the extension side chamber than the first extension side damping valve 16 and the first extension side check valve 17, is provided to connect the ports b1 and t2 to the partway in the third passage 15, and connects the port p1 to the other end of the pump passage 20.

When the solenoid 28 is not energized, the valve body 26 takes the neutral position 26b by the springs 27a and 27b, connects the ports a1 and t1 so as to communicate the first passage 13, connects the ports b1 and t2 so as to communicate the third passage 15, and closes the port p1 so as to block the other end of the pump passage 20.

Furthermore, when being pushed rightward by energizing the solenoid 28, the valve body 26 takes the left position 26a, closes the port t1 so as to block the first passage 13, connects the ports a1 and p1 so as to communicate the pump passage 20 with the extension side chamber R1, and connects the ports b1 and t2 so as to communicate the third passage 15.

Furthermore, when being pushed leftward by energizing the solenoid 28, the valve body 26 takes the right position 26c, closes the port t2 so as to block the third passage 15, connects the ports b1 and p1 so as to communicate the pump passage 20 with the compression side chamber R2, and connects the ports a1 and t1 so as to communicate the first passage 13.

Therefore, the switching valve V2 takes the neutral position 26b without energizing the solenoid 28, the pump passage 20 is blocked, and the shock absorber main body 1 is connected to the damper circuit C1 via the first passage 13 and the third passage 15, and this enables the damper circuit C1. Accordingly, the shock absorber D3 with the vehicle height adjustment function is in the damper mode. On the other hand, in a case where the solenoid 28 is energized and the switching valve V2 is switched to the left position 26a, the first passage 13 is blocked, the pump passage 20 is connected to the extension side chamber R1 so as to enable the pump P, the compression side chamber R2 is connected to the damper circuit C1 via the third passage 15, and the shock absorber D3 with the vehicle height adjustment function is in the vehicle height adjustment mode for lowering the vehicle height. Moreover, in a case where the solenoid 28 is energized and the switching valve V2 is switched to the right position 26c, the third passage 15 is blocked, the pump passage 20 is connected to the compression side chamber R2 so as to enable the pump P, the extension side chamber R1 is connected to the damper circuit C1 via the first passage 13, and the shock absorber D3 with the vehicle height adjustment function is in the vehicle height adjustment mode for increasing the vehicle height. In this way, the switching valve V2 can switch the mode of the shock absorber D3 with the vehicle height adjustment function by selecting one of the damper mode in which only the damper circuit C1 is enabled, the vehicle height adjustment mode in which the vehicle height is lowered while the pump P is enabled, and the vehicle height adjustment mode in which the vehicle height is increased while the pump P is enabled.

Note that, in the shock absorber D3 with the vehicle height adjustment function according to the present embodiment, the shock absorber main body 1 includes the relief passage 9 that connects the extension side chamber R1 to the compression side chamber R2, and the relief valve 102 that is provided in the relief passage 9, opens when the pressure of the extension side chamber R1 is higher than the pressure of the compression side chamber R2 and a difference between the pressure of the extension side chamber R1 and the pressure of the compression side chamber R2 reaches the valve opening pressure and allows the flow of the hydraulic oil (liquid) from the extension side chamber R1 toward the compression side chamber R2, and opens when the pressure of the compression side chamber R2 is higher than the pressure of the extension side chamber R1 and the difference between the pressure of the compression side chamber R2 and the pressure of the extension side chamber R1 reaches the valve opening pressure and allows the flow of the hydraulic oil (liquid) from the compression side chamber R2 toward the extension side chamber R1. According to the shock absorber D3 with the vehicle height adjustment function configured in this way, even if a situation occurs where the passenger makes the vehicle travel and the shock absorber main body 1 extends in a state where the vehicle height is lowered in the vehicle height adjustment mode, the pressure in the extension side chamber R1 does not become excessive, and in addition, even if a situation occurs where the passenger makes the vehicle travel and shock absorber main body 1 contracts in a state where the vehicle height is increased in the vehicle height adjustment mode, the pressure in the compression side chamber R2 does not become excessive, and the shock absorber D3 with the vehicle height adjustment function is protected.

The shock absorber D3 with the vehicle height adjustment function according to the second modification of the first embodiment is configured as described above, and an operation will be described below. First, an operation in a case where the switching valve V2 selects the neutral position 26b and the shock absorber D3 with the vehicle height adjustment function is in the damper mode will be described. In this state, a connection state between the shock absorber main body 1 and the damper circuit C1 in the shock absorber D3 with the vehicle height adjustment function is the same as a connection state between the shock absorber main body 1 and the damper circuit C1 in the shock absorber D1 with the vehicle height adjustment function according to the first embodiment in the damper mode. Therefore, in a case where the shock absorber D3 with the vehicle height adjustment function according to the second modification of the first embodiment is in the damper mode, if the operation similar to that of the shock absorber D1 with the vehicle height adjustment function according to the first embodiment in the damper mode is performed and the shock absorber main body 1 is expanded/contracted by the external force, the shock absorber D3 generates a damping force that prevents the expansion/contraction of the shock absorber main body 1.

Subsequently, an operation in a case where the switching valve V2 selects the left position 26a and the shock absorber D3 with the vehicle height adjustment function is in the vehicle height adjustment mode in which the vehicle height is lowered will be described. In this state, the connection state between the shock absorber main body 1, the pump P, and the damper circuit C1 in the shock absorber D3 with the vehicle height adjustment function is the same as the connection state between the shock absorber main body 1, the pump P, and the damper circuit C1 in the shock absorber D1 with the vehicle height adjustment function according to the first embodiment in the state of the vehicle height adjustment mode. Therefore, in a case where the shock absorber D3 with the vehicle height adjustment function according to the second modification of the first embodiment is in the vehicle height adjustment mode in which the vehicle height is lowered, an operation similar to the operation of the shock absorber D1 with the vehicle height adjustment function according to the first embodiment in the vehicle height adjustment mode may be performed, and the shock absorber main body 1 may be contracted by driving the pump P so as to lower the vehicle height. If the switching valve V2 is switched to the neutral position 26b and the shock absorber D3 with the vehicle height adjustment function is set to be in the damper mode after lowering the vehicle height, the extension side chamber R1 is connected to the compression side chamber R2 and the reservoir R via the damper circuit C1, and the extension of the shock absorber main body 1 is allowed. Therefore, the shock absorber main body 1 returns to an original displacement state before the vehicle height is lowered, with the resilient force of the suspension spring S.

Moreover, an operation in a case where the switching valve V2 selects the right position 26c and the shock absorber D3 with the vehicle height adjustment function is in the vehicle height adjustment mode in which the vehicle height is increased will be described. In this state, the connection state between the shock absorber main body 1, the pump P, and the damper circuit C1 in the shock absorber D3 with the vehicle height adjustment function is the same as the connection state between the shock absorber main body 1, the pump P, and the damper circuit C1 in the shock absorber D2 with the vehicle height adjustment function according to the first modification of the first embodiment in the state of the vehicle height adjustment mode. Therefore, in a case where the shock absorber D3 with the vehicle height adjustment function according to the second modification of the first embodiment is in the vehicle height adjustment mode in which the vehicle height is increased, an operation similar to that of the shock absorber D2 with the vehicle height adjustment function according to the first modification of the first embodiment in the vehicle height adjustment mode may be performed, the shock absorber main body 1 may be extended by driving the pump P, and the vehicle height may be increased. If the switching valve V2 is switched to the neutral position 26b and the shock absorber D3 with the vehicle height adjustment function is set to be in the damper mode after increasing the vehicle height, the hydraulic oil in the compression side chamber R2 can move to the extension side chamber R1 and the reservoir R through the damper circuit C1, and the contraction of the shock absorber main body 1 is allowed. Therefore, the shock absorber main body 1 contracts and receives the load of the vehicle body, and returns to an original displacement state before the vehicle height is increased.

As described above, the shock absorbers D1 to D3 with the vehicle height adjustment function according to the present embodiment includes the shock absorber main body 1 including the cylinder 2 filled with the hydraulic oil (liquid), the piston 3 that is movably inserted into the cylinder 2 and partitions the inside of the cylinder 2 into the extension side chamber R1 and the compression side chamber R2, and the piston rod 4 that is movably inserted into the cylinder 2 and is coupled to the piston 3, the suspension spring S that biases the shock absorber main body 1 in the extending direction, the reservoir R that accumulates the hydraulic oil (liquid), the damper circuit C1 that is connected to the extension side chamber R1, the compression side chamber R2, and the reservoir R and generates a damping force in the shock absorber main body 1 at the time when the shock absorber main body 1 expands/contracts, the pump P that can suck the liquid from the reservoir R and discharge the liquid, and the switching valves V1 and V2 that are installed between the shock absorber main body 1, the damper circuit C1, and the pump P and can switch the mode between the damper mode in which the damping force is generated for the shock absorber main body 1 by connecting the shock absorber main body 1 to the damper circuit C1 and the vehicle height adjustment mode in which the shock absorber main body 1 is connected to the pump P.

In the shock absorbers D1 to D3 with the vehicle height adjustment function configured in this way, since the damper circuit C1 and the pump P can be selectively enabled by the switching valves V1 and V2, the reservoir R used to supply and discharge the hydraulic oil (liquid) that becomes excessive or insufficient in the cylinder 2 when the shock absorber main body 1 generates the damping force can be used as a tank that accumulates the hydraulic oil (liquid) to be supplied into the shock absorber main body 1 when the vehicle height is adjusted. Furthermore, in the shock absorbers D1 to D3 with the vehicle height adjustment function configured in this way, since the pump P is driven to supply the hydraulic oil (liquid) into the shock absorber main body 1 and the shock absorber main body 1 can be extended or contracted or expanded/contracted, there is no need to include a jack for driving the spring seat of the suspension spring S.

As described above, according to the shock absorbers D1 to D3 with the vehicle height adjustment function configured in this way, a jack and a tank for the jack that are necessary for the typical shock absorber with the vehicle height adjustment function are not necessary. Therefore, even if the shock absorbers D1 to D3 have the vehicle height adjustment function, the shock absorbers D1 to D3 can be miniaturized.

Furthermore, in the shock absorbers D1 to D3 with the vehicle height adjustment function according to the present embodiment, in the state of the vehicle height adjustment mode, the switching valves V1 and V2 connect the pump P to one of the extension side chamber R1 and the compression side chamber R2 of the shock absorber main body 1, and connect the other one of the extension side chamber R1 and the compression side chamber R2 to the reservoir R via the damper circuit C1. According to the shock absorbers D1 to D3 with the vehicle height adjustment function configured in this way, since the chamber to be compressed that is one of the extension side chamber R1 and the compression side chamber R2 is connected to the reservoir R by using the damper circuit C1 at the time of vehicle height adjustment, it is not necessary to include a passage that communicates the compression side chamber with the reservoir R for only vehicle height adjustment. Therefore, the shock absorbers D1 to D3 can be further miniaturized.

Furthermore, in the shock absorbers D1 to D3 with the vehicle height adjustment function according to the present embodiment, the damper circuit C1 includes the first passage 13 of which one end is connected to the extension side chamber R1, the second passage 14 that connects another end of the first passage 13 to the reservoir R, the third passage 15 that connects the first connection point J1 that is the connection point between the first passage 13 and the second passage 14 to the compression side chamber R2, the first extension side damping valve 16 that is provided in the first passage 13 and gives a resistance to the flow of the hydraulic oil (liquid) from the extension side chamber R1 toward the first connection point J1, the first extension side check valve 17 that is provided in the first passage 13 in parallel to the first extension side damping valve 16 and allows only the flow of the hydraulic oil (liquid) from the first connection point J1 toward the extension side chamber R1, the first compression side damping valve 18 that is provided in the second passage 14 and gives a resistance to the flow of the hydraulic oil (liquid) from the first connection point J1 toward the reservoir R, and the first compression side check valve 19 that is provided in the second passage 14 in parallel to the first compression side damping valve 18 and allows only the flow of the hydraulic oil (liquid) from the reservoir R toward the first connection point J1. According to the shock absorbers D1 to D3 with the vehicle height adjustment function configured in this way, when the vehicle height adjustment mode is switched to the damper mode, the shock absorber main body 1 extends or contracts, and the vehicle height is returned to the original state before the vehicle height adjustment, the first extension side damping valve 16 or the first compression side damping valve 18 gives a resistance to the flow of the hydraulic oil (liquid). Therefore, the expansion/contraction of the shock absorber main body 1 becomes slower, and it is not necessary to make the passenger feel uncomfortable.

Moreover, in a case where the switching valve V1 has the first position 23a where the first passage 13 is communicated and the connection between the pump P and the shock absorber main body 1 is disconnected in the damper mode and the second position 23b where the first passage 13 is blocked and the pump P is connected to the shock absorber main body 1 in the vehicle height adjustment mode, the shock absorber D1 with the vehicle height adjustment function may make the shock absorber main body 1 contract in the vehicle height adjustment mode so as to lower the vehicle height. Furthermore, in a case where the switching valve V1 has the first position 23a where the third passage 15 is communicated and the connection between the pump P and the shock absorber main body 1 is disconnected in the damper mode and the second position 23b where the third passage 15 is blocked and the pump P is connected to the shock absorber main body 1 in the vehicle height adjustment mode, the shock absorber D2 with the vehicle height adjustment function may raise the shock absorber main body 1 in the vehicle height adjustment mode and increase the vehicle height. Then, in addition, in a case where the switching valve V2 selectively takes two positions including the neutral position 26b where the first passage 13 is communicated with the third passage 15 and the connection between the pump P and the shock absorber main body 1 is disconnected in the damper mode, the left position 26a in which the first passage 13 is blocked and the pump P is connected to the shock absorber main body 1 in the vehicle height adjustment mode, and the right position 26c where the third passage 15 is blocked and the pump P is connected to the shock absorber main body 1, the shock absorber D3 with the vehicle height adjustment function may raise or lower the shock absorber main body 1 in the vehicle height adjustment mode and may increase and lower the vehicle height.

Furthermore, in the shock absorbers D1 and D3 with the vehicle height adjustment function according to the present embodiment, the shock absorber main body 1 includes the relief passage 9 that connects the extension side chamber R1 to the compression side chamber R2 and the relief valves 10 and 102 that are provided in the relief passage 9, open when the differential pressure between the extension side chamber R1 and the compression side chamber R2 reaches the valve opening pressure, and allow the flow of the hydraulic oil (liquid) from the extension side chamber R1 toward the compression side chamber R2. According to the shock absorbers D1 and D3 with the vehicle height adjustment function configured in this way, even if a situation occurs where the passenger makes the vehicle travel and the shock absorber main body 1 extends in a state where the vehicle height is lowered in the vehicle height adjustment mode, the pressure in the extension side chamber R1 does not become excessive, and the shock absorbers D1 and D3 with the vehicle height adjustment function are protected. Moreover, in the shock absorbers D2 and D3 with the vehicle height adjustment function according to the present embodiment, the shock absorber main body 1 includes the relief passage 9 that connects the extension side chamber R1 to the compression side chamber R2 and the relief valves 101 and 102 that are provided in the relief passage 9, open when the differential pressure between the compression side chamber R2 and the extension side chamber R1 reaches the valve opening pressure, and allow the flow of the hydraulic oil (liquid) from the compression side chamber R2 toward the extension side chamber R1. According to the shock absorbers D2 and D3 with the vehicle height adjustment function configured in this way, even if a situation occurs where the passenger makes the vehicle travel and the shock absorber main body 1 contracts in a state where the vehicle height is increased in the vehicle height adjustment mode, the pressure in the compression side chamber R2 does not become excessive, and the shock absorbers D2 and D3 with the vehicle height adjustment function are protected.

Second Embodiment

Figure 4:
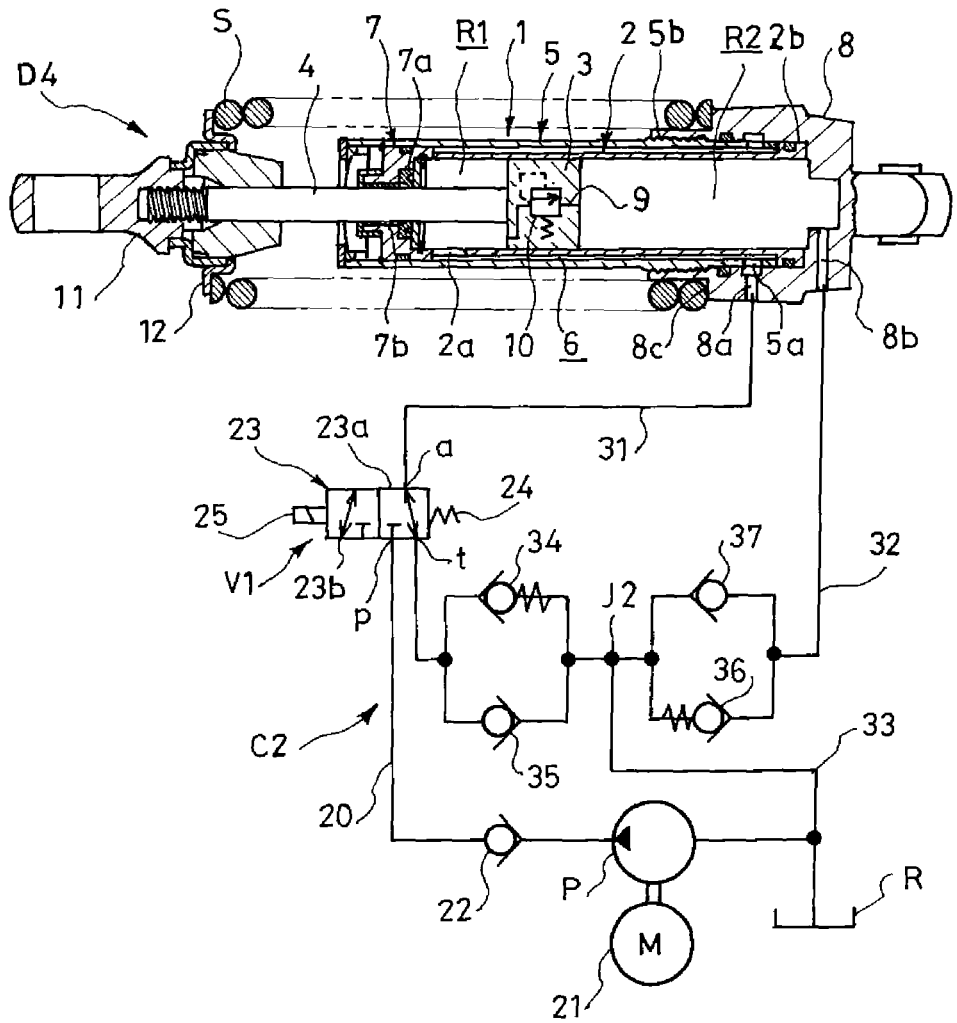
FIG. 4 is a diagram illustrating a shock absorber with a vehicle height adjustment function according to a second embodiment.

As illustrated in FIG. 4, a shock absorber D4 with a vehicle height adjustment function according to a second embodiment includes a shock absorber main body 1, a suspension spring S that biases the shock absorber main body 1 in an extending direction, a reservoir R that accumulates liquid, a damper circuit C2, a pump P, a switching valve V1. A configuration of the damper circuit C2 of the shock absorber D4 with the vehicle height adjustment function according to the second embodiment is different from the shock absorber D1 with the vehicle height adjustment function according to the first embodiment.

The damper circuit C2 includes a fourth passage 31 of which one end is connected to an extension side chamber R1, a fifth passage 32 that connects a compression side chamber R2 to another end of the fourth passage 31, a sixth passage 33 that connects a second connection point J2 that is a connection point between the fourth passage 31 and the fifth passage 32 to the reservoir R, a second extension side damping valve 34 that is provided in the fourth passage 31 and gives a resistance to a flow of hydraulic oil from the extension side chamber R1 toward the second connection point J2, a second extension side check valve 35 that is provided in the fourth passage 31 in parallel to the second extension side damping valve 34 and allows only a flow of the hydraulic oil from the second connection point J2 toward the extension side chamber R1, a second compression side damping valve 36 that is provided in the fifth passage 32 and gives a resistance to a flow of the hydraulic oil from the compression side chamber R2 toward the second connection point J2, and a second compression side check valve 37 that is provided in the fifth passage 32 in parallel to the second compression side damping valve 36 and allows only a flow of the hydraulic oil from the second connection point J2 toward the compression side chamber R2.

As described above, the one end of the fourth passage 31 is connected to the extension side chamber R1, and the other end is connected to the fifth passage 32. Moreover, one end of the fifth passage 32 is connected to the compression side chamber R2, and another end is connected to the fourth passage 31. In this way, the fourth passage 31 and the fifth passage 32 are connected in series, and the extension side chamber R1 is connected to the compression side chamber R2 via the fourth passage 31 and the fifth passage 32. Furthermore, one end of the sixth passage 33 is connected to the second connection point J2 between the fourth passage 31 and the fifth passage 32, and another end is connected to the reservoir R. Therefore, the extension side chamber R1 and the compression side chamber R2 are connected to each other via the fourth passage 31 and the fifth passage 32. Furthermore, the extension side chamber R1 is connected to the reservoir R via the fourth passage 31 and the sixth passage 33, and the compression side chamber R2 is connected to the reservoir R via the fifth passage 32 and the sixth passage 33.

In the shock absorber D4 with the vehicle height adjustment function according to the present embodiment, the second extension side damping valve 34 is a damping valve that allows only the flow of the hydraulic oil that passes through the fourth passage 31 from the extension side chamber R1 toward the second connection point J2 and gives a resistance to the flow that is passing and is, for example, a leaf valve, a poppet valve, or the like. Note that the second extension side damping valve 34 may be a valve that allows a bidirectional flow, such as an orifice or a choke. Furthermore, the second extension side check valve 35 is provided in the fourth passage 31 in parallel to the second extension side damping valve 34, allows only the flow of the hydraulic oil that passes through the fourth passage 31 from the second connection point J2 toward the extension side chamber R1, and prevents a reverse flow of the hydraulic oil. Therefore, in a case where the hydraulic oil flows through the fourth passage 31 from the extension side chamber R1 toward the second connection point J2, the hydraulic oil passes through the second extension side damping valve 34, and conversely, in a case where the hydraulic oil flows through the fourth passage 31 from the second connection point J2 toward the extension side chamber R1, the hydraulic oil passes through the second extension side check valve 35.

In the shock absorber D4 with the vehicle height adjustment function according to the present embodiment, the second compression side damping valve 36 is a damping valve that allows only the flow of the hydraulic oil that passes through the fifth passage 32 from the compression side chamber R2 toward the second connection point J2 and gives a resistance to the flow that is passing and is, for example, a leaf valve, a poppet valve, or the like. Note that the second compression side damping valve 36 may be a valve that allows a bidirectional flow, such as an orifice or a choke. Furthermore, the second compression side check valve 37 is provided in the fifth passage 32 in parallel to the second compression side damping valve 36, allows only the flow of the hydraulic oil that passes through the fifth passage 32 from the second connection point J2 toward the compression side chamber R2, and prevents a reverse flow of the hydraulic oil. Therefore, in a case where the hydraulic oil flows through the fifth passage 32 from the compression side chamber R2 toward the second connection point J2, the hydraulic oil passes through the second compression side damping valve 36, and conversely, in a case where the hydraulic oil flows through the fifth passage 32 from the second connection point J2 toward the compression side chamber R2, the hydraulic oil passes through the second compression side check valve 37.

Similarly to the switching valve V1 in the shock absorber D1 with the vehicle height adjustment function according to the first embodiment, the switching valve V1 is a three-port two-position solenoid switching valve including three ports a, t, and p, connects the ports a and t to the partway in the fourth passage 31, is provided on the side of the extension side chamber than the second extension side damping valve 34 and the second extension side check valve 35, and connects the port p to another end of a pump passage 20. Specifically, the switching valve V1 includes a valve body 23 having a first position 23a where the ports a and t are connected so as to communicate the fourth passage 31 and closes the port p so as to block the other end of the pump passage 20 and a second position 23b where the port t is closed so as to block the fourth passage 31 and the ports a and p are connected so as to communicate between the pump passage 20 and the extension side chamber R1, a spring 24 that biases the valve body 23 so as to take the first position 23a, and a solenoid 25 that switches the valve body 23 to the second position 23b against biases of the spring 24 at the time of energization. Therefore, the switching valve V1 takes the first position 23a without energizing the solenoid 25, the pump passage 20 is blocked, and the shock absorber main body 1 is connected to the damper circuit C2 via the fourth passage 31, and this enables the damper circuit C2. Accordingly, the shock absorber D4 with the vehicle height adjustment function is in a damper mode. On the other hand, in a case where the solenoid 25 is energized and the switching valve V1 takes the second position 23b, the fourth passage 31 is blocked, and the pump passage 20 is connected to the extension side chamber R1, and the pump P is enabled. Accordingly, the shock absorber D4 with the vehicle height adjustment function is in a vehicle height adjustment mode. In this way, the switching valve V1 can select one of the damper mode in which only the damper circuit C2 is enabled and the vehicle height adjustment mode in which the pump P is enabled, and can switch the mode of the shock absorber D1 with the vehicle height adjustment function.

The shock absorber D4 with the vehicle height adjustment function according to the second embodiment is configured as described above, and an operation will be described below. First, an operation in a case where the switching valve V1 selects the first position 23a and the shock absorber D4 with the vehicle height adjustment function is in the damper mode will be described.

In the damper mode, with the switching valve V1, the extension side chamber R1, the compression side chamber R2, and the reservoir R are connected to each other via the damper circuit C2, the pump passage 20 is blocked, and the connection between the extension side chamber R1 and the pump P is disconnected.

Then, when the shock absorber main body 1 is extended by an external force, the piston 3 moves leftward in FIG. 4 in the cylinder 2 so as to compress the extension side chamber R1 and expand the compression side chamber R2. The hydraulic oil pushed out from the extension side chamber R1 along with the movement of the piston 3 passes through the second extension side damping valve 34 of the fourth passage 31 and moves to the compression side chamber R2, that is expanded, via the second compression side check valve 37 of the fifth passage 32. At the time of extension operation of the shock absorber main body 1, the piston rod 4 exits from the inside of the cylinder 2. Therefore, an amount of the hydraulic oil that moves from the extension side chamber R1 to the compression side chamber R2 cannot cover an expanded volume of the compression side chamber R2, and the hydraulic oil corresponding to the volume of the piston rod 4 that has exited from the inside of the cylinder 2 becomes insufficient in the compression side chamber R2. This insufficient amount of the hydraulic oil passes through the sixth passage 33 and the second compression side check valve 37 of the fifth passage 32 from the reservoir R and is supplied to the compression side chamber R2. When the shock absorber main body 1 performs the extension operation, as described above, since the second extension side damping valve 34 gives a resistance to the flow of the hydraulic oil that moves from the extension side chamber R1 to the compression side chamber R2, the pressure in the compression side chamber R2 is substantially equal to the pressure in the reservoir R, while the pressure in the extension side chamber R1 increases. Therefore, the shock absorber D4 with the vehicle height adjustment function generates an extension side damping force that prevents the extension of the shock absorber main body 1.

When the shock absorber main body 1 contracts by the external force, the piston 3 moves rightward in FIG. 1 in the cylinder 2 so as to compress the compression side chamber R2 and expand the extension side chamber R1. The hydraulic oil pushed out from the compression side chamber R2 along with the movement of the piston 3 passes through the second compression side damping valve 36 of the fifth passage 32 and the second extension side check valve 35 of the fourth passage 31 and moves to the extension side chamber R1 that is expanded. As the time of a contraction operation of the shock absorber main body 1, the piston rod 4 enters the cylinder 2. Therefore, an amount of the hydraulic oil pushed out from the compression side chamber R2 is excessively larger than the expanded volume of the extension side chamber R1 by a volume of the piston rod 4 entering the cylinder 2. The excessive hydraulic oil passes through the second compression side damping valve 36 in the fifth passage 32 and the sixth passage 33 from the compression side chamber R2 and is discharged to the reservoir R. Therefore, when the shock absorber main body 1 performs a contraction operation, the hydraulic oil pushed out from the compression side chamber R2 always passes through the second compression side damping valve 36, and a resistance is given to the flow of the hydraulic oil. Therefore, the pressure in the compression side chamber R2 increases, the pressure in the extension side chamber R1 becomes substantially equal to the pressure in the reservoir R, and the shock absorber D4 with the vehicle height adjustment function generates a compression side damping force that prevents the contraction of the shock absorber main body 1.

Therefore, in a case where the shock absorber D4 with the vehicle height adjustment function is in the damper mode, if the shock absorber main body 1 is expanded/contracted by the external force, the shock absorber D4 with the vehicle height adjustment function generates the damping force that prevents the expansion/contraction of the shock absorber main body 1.

Subsequently, an operation in a case where the switching valve V1 selects the second position 23b and the shock absorber D4 with the vehicle height adjustment function is in the vehicle height adjustment mode will be described. When the switching valve V1 takes the second position 23b, the pump passage 20 is connected to the extension side chamber R1, the fourth passage 31 is blocked, and the hydraulic oil does not flow in a portion from the switching valve V1 to the second connection point J2 in the fourth passage 31.

In this state, if the pump P is driven by the motor 21 and the hydraulic oil is supplied from the reservoir R to the extension side chamber R1, the hydraulic oil pushes the piston 3 rightward in FIG. 4, and the shock absorber main body 1 performs the contraction operation. Along with the contraction operation of the shock absorber main body 1, the extension side chamber R1 is expanded, the compression side chamber R2 is compressed, and the hydraulic oil is pushed out from the compression side chamber R2. The pushed hydraulic oil passes through the second compression side damping valve 36 of the fifth passage 32 and the sixth passage 33 and is discharged to the reservoir R.

Therefore, in a case where the shock absorber D4 with the vehicle height adjustment function is in the vehicle height adjustment mode, by driving the pump P, the shock absorber D4 with the vehicle height adjustment function may compress the suspension spring S, contract the shock absorber main body 1, and lower the height of the vehicle. Since a resilient force of the suspension spring S increases by only an amount by which the suspension spring S is compressed and the shock absorber main body 1 is biased in the extending direction, the pressure in the extension side chamber R1 increases. Note that, even if the driving of the pump P is stopped, the pump passage check valve 22 is provided in the pump passage 20 and the hydraulic oil in the extension side chamber R1 cannot move. Therefore, the shock absorber main body 1 is maintained to be in a contracted state, and the vehicle height is maintained to be in a lowered state. Furthermore, the shock absorber D4 with the vehicle height adjustment function can adjust a contraction amount of the shock absorber main body 1 according to an amount of the hydraulic oil supplied from the pump P. If a stroke sensor that detects an expansion/contraction displacement of the shock absorber main body 1 is provided, the extension amount of the shock absorber main body 1 can be recognized. Therefore, if the motor 21 is controlled while monitoring the contraction amount of the shock absorber main body 1, the contraction amount of the shock absorber main body 1 can be adjusted to a predetermined contraction amount. Furthermore, for example, in a case where a passenger of the vehicle can perform an operation to energize the motor 21, the passenger can adjust the height by driving the pump P until the vehicle height reaches a desired height.

Note that when the external force for extending the shock absorber main body 1 acts and the pressure in the extension side chamber R1 reaches a preset upper limit pressure in a state where the shock absorber main body 1 contracts in a state where the shock absorber D4 with the vehicle height adjustment function is in the vehicle height adjustment mode, the relief valve 10 opens, and the hydraulic oil can move from the inside of the extension side chamber R1 to the compression side chamber R2. Therefore, even in a situation occurs where the passenger makes the vehicle travel and the shock absorber main body 1 extends, in a state where the shock absorber D4 with the vehicle height adjustment function is in the vehicle height adjustment mode, the pressure in the extension side chamber R1 does not become excessive, and the shock absorber D4 with the vehicle height adjustment function is protected.

Then, after lowering the vehicle height by setting the shock absorber D4 with the vehicle height adjustment mode to be in the vehicle height adjustment mode, the switching valve V1 is switched from the second position 23b to the first position 23a, and the shock absorber D4 with the vehicle height adjustment function is set to be in the damper mode. Then, the extension side chamber R1 is connected to the damper circuit C2 via the fourth passage 31, the pump passage 20 is blocked, and the connection between the pump P and the extension side chamber R1 is disconnected. Then, since the suspension spring S compressed by lowering the vehicle height extends the shock absorber main body 1, the hydraulic oil is pushed out from the extension side chamber R1, passes through the second extension side damping valve 34 and the second compression side check valve 37 of the fifth passage 32, and moves to the compression side chamber R2, and the hydraulic oil of an amount corresponding to the volume of the piston rod 4 exits from the cylinder 2 moves from the reservoir R to the compression side chamber R2 via the sixth passage 33 and the second compression side check valve 37. Since the suspension spring S extends until a resilient force of the suspension spring S is balanced with a load received from a vehicle body of the vehicle, the shock absorber main body 1 returns from a state where the vehicle height is lowered to a state before the vehicle height is lowered. Therefore, when the mode is switched from the vehicle height adjustment mode to the damper mode, the shock absorber D4 with the vehicle height adjustment function can return to a state before the vehicle height adjustment using a resilient force of the suspension spring S. Furthermore, the state where the shock absorber main body 1 is contracted returns to an original state, since the second extension side damping valve 34 gives a resistance to the flow of the hydraulic oil, an extension speed of the shock absorber main body 1 becomes moderately slow, and it is not necessary to make the passenger feel uncomfortable.

As described above, in a case where the shock absorber D4 with the vehicle height adjustment function is in the vehicle height adjustment mode, the vehicle height is lowered by driving the pump P. However, in a case where it is desired to increase the vehicle height in the vehicle height adjustment mode, it is sufficient to configure the shock absorber D4 as a shock absorber D5 with a vehicle height adjustment function according to a first modification of the second embodiment illustrated in FIG. 5.

An installation position of the switching valve V1 of the shock absorber D5 with the vehicle height adjustment function according to the first modification of the second embodiment is different from that of the shock absorber D4 with the vehicle height adjustment function according to the second embodiment.

In the shock absorber D4 with the vehicle height adjustment function, the switching valve V1 is provided partway in the fourth passage 31 and the connection between the extension side chamber R1 and the damper circuit C2 and the connection between the extension side chamber R1 and the pump passage 20 are selectively switched by switching the switching valve V1. However, in a case where it is desired to increase the vehicle height in the vehicle height adjustment mode, as the shock absorber D5 with the vehicle height adjustment function, it is sufficient that the switching valve V1 be provided partway in the fifth passage 32 and the connection between the compression side chamber R2 and the damper circuit C2 and the connection between the compression side chamber R2 and the pump passage 20 be selectively switched by switching the switching valve V1.

Figure 5:
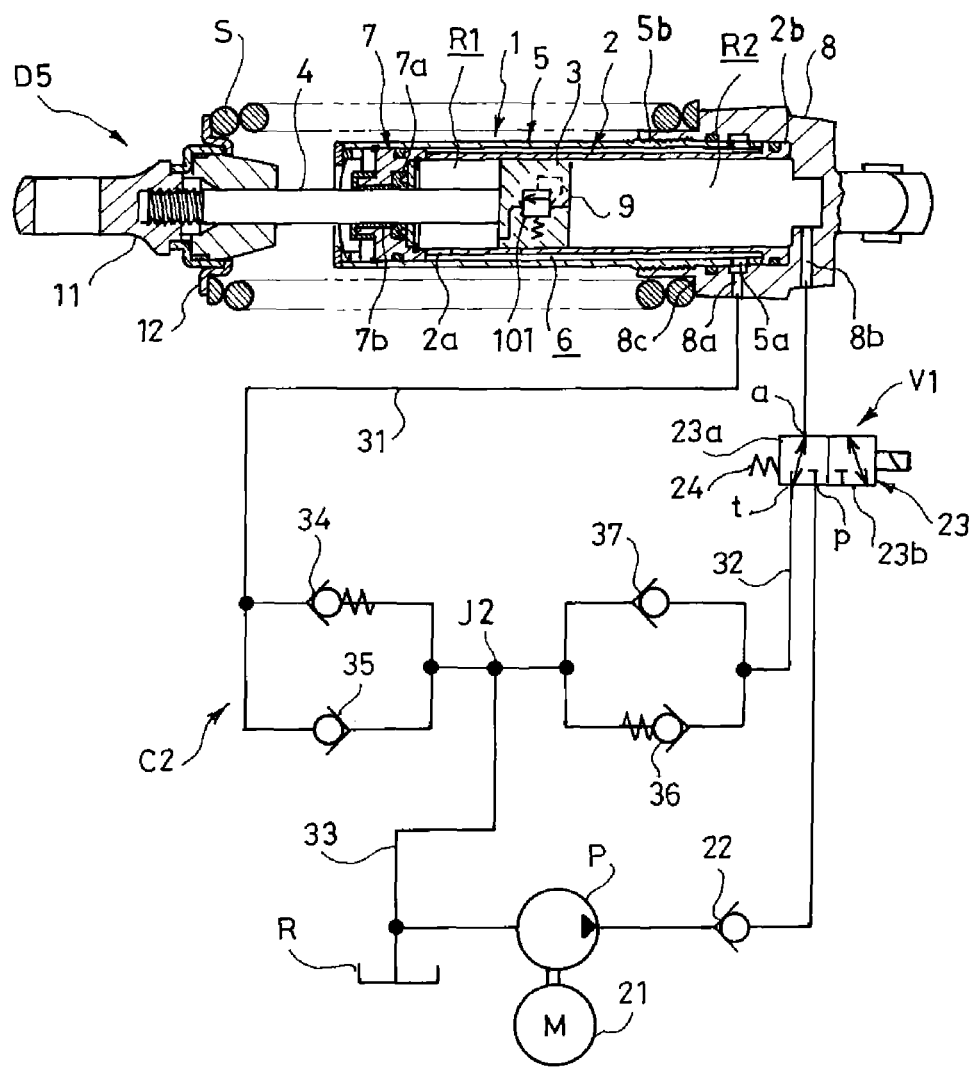
FIG. 5 is a diagram illustrating a shock absorber with a vehicle height adjustment function according to a first modification of the second embodiment.

Specifically, as illustrated in FIG. 5, it is sufficient that the ports a and t of the switching valve V1 be connected to the partway in the fifth passage 32 and the port p of the switching valve V1 be connected to the other end of the pump passage 20. That is, when taking the first position 23a, the switching valve V1 connects the compression side chamber R2 and the damper circuit C2 by connecting the ports a and t so as to communicate with the fifth passage 32 and disconnects the connection between the pump P and the compression side chamber R2 by closing the port p. Furthermore, when taking the second position 23b, the switching valve V1 disconnects the connection between the compression side chamber R2 and the damper circuit C2 by closing the port t and blocking the fifth passage 32 and connects the pump P with the compression side chamber R2 by connecting the ports a and p. Therefore, the switching valve V1 takes the first position 23a without energizing the solenoid 25, the pump passage 20 is blocked, and the shock absorber main body 1 is connected to the damper circuit C2 via the fifth passage 32, and this enables the damper circuit C2. Accordingly, the shock absorber D5 with the vehicle height adjustment function is in the damper mode. On the other hand, in a case where the solenoid 25 is energized and the switching valve V1 takes the second position 23b, the fifth passage 32 is blocked, and the pump passage 20 is connected to the compression side chamber R2, and the pump P is enabled. Accordingly, the shock absorber D5 with the vehicle height adjustment function is in the vehicle height adjustment mode. In this way, the switching valve V1 can select one of the damper mode in which only the damper circuit C2 is enabled and the vehicle height adjustment mode in which the pump P is enabled and switch the modes, in the shock absorber D5 with the vehicle height adjustment function according to the first modification of the second embodiment. Note that, in the shock absorber D5 with the vehicle height adjustment function according to the first modification, a relief valve 101 is provided in the relief passage 9 in a direction opposite to that of the shock absorber D1 with the vehicle height adjustment function.

The shock absorber D5 with the vehicle height adjustment function according to the first modification of the second embodiment is configured as described above, and an operation will be described below. First, an operation in a case where the switching valve V1 selects the first position 23a and the shock absorber D5 with the vehicle height adjustment function is in the damper mode will be described.

In the damper mode, with the switching valve V1, while the compression side chamber R2 is connected to the damper circuit C2 via the fifth passage 32 and the extension side chamber R1, the compression side chamber R2, and the reservoir R are connected to each other via the damper circuit C2, the pump passage 20 is blocked and the connection between the compression side chamber R2 and the pump P is disconnected.

First, when the shock absorber main body 1 is extended by the external force, the piston 3 moves leftward in FIG. 1 in the cylinder 2 so as to compress the extension side chamber R1 and expand the compression side chamber R2. The hydraulic oil pushed out from the extension side chamber R1 along with the movement of the piston 3 passes through the second extension side damping valve 34 of the fourth passage 31 and moves to the compression side chamber R2, that is expanded, via the second compression side check valve 37 of the fifth passage 32. At the time of extension operation of the shock absorber main body 1, the piston rod 4 exits from the inside of the cylinder 2. Therefore, an amount of the hydraulic oil that moves from the extension side chamber R1 to the compression side chamber R2 cannot cover an expanded volume of the compression side chamber R2, and the hydraulic oil corresponding to the volume of the piston rod 4 that has exited from the inside of the cylinder 2 becomes insufficient in the compression side chamber R2. This insufficient amount of the hydraulic oil passes through the sixth passage 33 and the second compression side check valve 37 of the fifth passage 32 from the reservoir R and is supplied to the compression side chamber R2. When the shock absorber main body 1 performs the extension operation, as described above, since the second extension side damping valve 34 gives a resistance to the flow of the hydraulic oil that moves from the extension side chamber R1 to the compression side chamber R2, the pressure in the compression side chamber R2 is substantially equal to the pressure in the reservoir R, while the pressure in the extension side chamber R1 increases. Therefore, the shock absorber D2 with the vehicle height adjustment function generates an extension side damping force that prevents the extension of the shock absorber main body 1.

Subsequently, when the shock absorber main body 1 contracts by the external force, the piston 3 moves rightward in FIG. 1 in the cylinder 2 so as to compress the compression side chamber R2 and expand the extension side chamber R1. The hydraulic oil pushed out from the compression side chamber R2 along with the movement of the piston 3 passes through the second compression side damping valve 36 of the fifth passage 32 and the second extension side check valve 35 of the fourth passage 31 to the extension side chamber R1 that is expanded. As the time of a contraction operation of the shock absorber main body 1, the piston rod 4 enters the cylinder 2. Therefore, an amount of the hydraulic oil pushed out from the compression side chamber R2 is excessively larger than the expanded volume of the extension side chamber R1 by a volume of the piston rod 4 entering the cylinder 2. After passing through the second compression side damping valve 36 of the fifth passage 32 from the compression side chamber R2, the excessive hydraulic oil is discharged to the reservoir R via the sixth passage 33. As described above, when the shock absorber main body 1 performs a contraction operation, the hydraulic oil pushed out from the compression side chamber R2 always passes through the second compression side damping valve 36, and a resistance is given to the flow of the hydraulic oil. Therefore, the pressure in the compression side chamber R2 increases, the pressure in the extension side chamber R1 becomes substantially equal to the pressure in the reservoir R, and the shock absorber D5 with the vehicle height adjustment function generates a compression side damping force that prevents the contraction of the shock absorber main body 1.

Therefore, in a case where the shock absorber D5 with the vehicle height adjustment function is in the damper mode, if the shock absorber main body 1 is expanded/contracted by the external force, the shock absorber D5 with the vehicle height adjustment function generates the damping force that prevents the expansion/contraction of the shock absorber main body 1.

Subsequently, an operation in a case where the switching valve V1 selects the second position 23b and the shock absorber D5 with the vehicle height adjustment function is in the vehicle height adjustment mode will be described. When the switching valve V1 takes the second position 23b, the pump passage 20 is connected to the compression side chamber R2, the fifth passage 32 is blocked, and the hydraulic oil does not flow in a portion from the switching valve V1 to the second connection point J2 in the fifth passage 32.

In this state, if the pump P is driven by the motor 21 and the hydraulic oil is supplied from the reservoir R to the compression side chamber R2, the hydraulic oil pushes the piston 3 leftward in FIG. 5, and the shock absorber main body 1 performs the extension operation. Along with the extension operation of the shock absorber main body 1, the compression side chamber R2 is expanded, the extension side chamber R1 is compressed, and the hydraulic oil is pushed out from the extension side chamber R1. The pushed hydraulic oil passes through the second extension side damping valve 34 of the fourth passage 31 and the sixth passage 33 and is discharged to the reservoir R.

Therefore, in a case where the shock absorber D5 with the vehicle height adjustment function is in the vehicle height adjustment mode, by driving the pump P, the shock absorber D5 with the vehicle height adjustment function may extend the shock absorber main body 1, lift the vehicle body of the vehicle, and increase the vehicle height. Since the suspension spring S also extends along with the extension of the shock absorber main body 1 and the resilient force of the suspension spring S decreases, the shock absorber main body 1 shares and supports the load of the vehicle body, and the pressure in the compression side chamber R2 increases. Note that, even if the driving of the pump P is stopped, the pump passage check valve 22 is provided in the pump passage 20, and the hydraulic oil in the extension side chamber R1 cannot move. Therefore, the shock absorber main body 1 is maintained to be in an extended state, and the vehicle height is maintained to be increased.

Furthermore, the shock absorber D5 with the vehicle height adjustment function can adjust an extension amount of the shock absorber main body 1 according to the amount of the hydraulic oil to be supplied from the pump P. If the stroke sensor that detects an expansion/contraction displacement of the shock absorber main body 1 is provided, the extension amount of the shock absorber main body 1 can be recognized. Therefore, if the motor 21 is controlled while monitoring the extension amount of the shock absorber main body 1 using the stroke sensor, the extension amount of the shock absorber main body 1 can be adjusted to a predetermined extension amount. Furthermore, for example, in a case where a passenger of the vehicle can perform an operation to energize the motor 21, the passenger can adjust the height by driving the pump P until the vehicle height reaches a desired height.

Note that, in the shock absorber D5 with the vehicle height adjustment function, the relief valve 101 is provided that opens when a pressure of the compression side chamber R2 exceeds a pressure of the extension side chamber R1 by a predetermined pressure or more and allows the flow of the hydraulic oil from the compression side chamber R2 toward the extension side chamber R1. In this way, even if a situation occurs where the passenger makes the vehicle travel and the shock absorber main body 1 contracts in a state where the shock absorber D5 with the vehicle height adjustment function is in the vehicle height adjustment mode, the contraction of the shock absorber main body 1 is allowed, and vibration of the vehicle body can be reduced.

Then, after increasing the vehicle height by setting the shock absorber D5 with the vehicle height adjustment function to be in the vehicle height adjustment mode, the switching valve V1 is switched from the second position 23b to the first position 23a, and the shock absorber D2 with the vehicle height adjustment function is set to be in the damper mode. Then, the compression side chamber R2 is connected to the damper circuit C2 via the fifth passage 32, the pump passage 20 is blocked, and the connection between the pump P and the compression side chamber R2 is disconnected. Then, since the suspension spring S extended by increasing the vehicle height and the shock absorber main body 1 contract by the load received from the vehicle body, the hydraulic oil is pushed out from the compression side chamber R2, passes through the second compression side damping valve 36 and the second extension side check valve 35, and moves to the extension side chamber R1, and the hydraulic oil of an amount corresponding to the volume of the piston rod 4 entering the cylinder 2 moves from the compression side chamber R2 to the reservoir R via the second compression side damping valve 36 of the fifth passage 32 and the sixth passage 33. Since the suspension spring S contracts until the resilient force of the suspension spring S is balanced with the load received from the vehicle body of the vehicle, the shock absorber main body 1 returns from a state where the vehicle height is increased to a state before the vehicle height is increased. Therefore, when the mode is switched from the vehicle height adjustment mode to the damper mode, the shock absorber D5 with the vehicle height adjustment function can return to a state before the vehicle height adjustment using the load received from the vehicle body. Furthermore, the state where the shock absorber main body 1 is extended returns to the original state, since the second compression side damping valve 36 gives a resistance to the flow of the hydraulic oil, a contraction speed of the shock absorber main body 1 becomes moderately slow, and it is not necessary to make the passenger feel uncomfortable.

Figure 6:
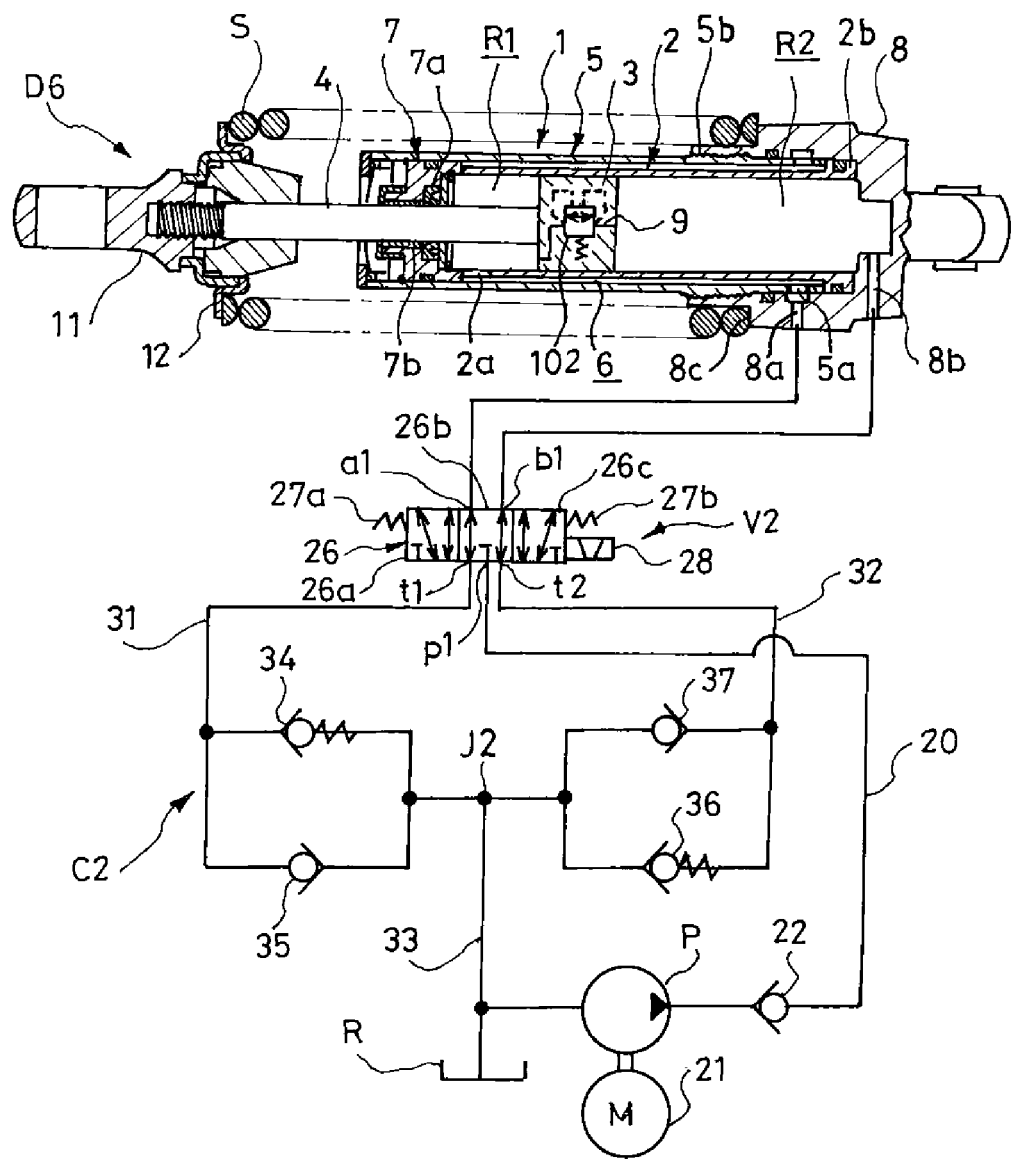
FIG. 6 is a diagram illustrating a shock absorber with a vehicle height adjustment function according to a second modification of the second embodiment.

As described above, in a case where the shock absorber D4 with the vehicle height adjustment function is in the vehicle height adjustment mode, the vehicle height is lowered by driving the pump P, and in a case where the shock absorber D5 with the vehicle height adjustment function is in the vehicle height adjustment mode, the vehicle height is increased by driving the pump P. However, in a case where it is desired to increase and lower the vehicle height in the vehicle height adjustment mode, it is sufficient to configure the shock absorber as a shock absorber D6 with a vehicle height adjustment function according to a second modification of the second embodiment illustrated in FIG. 6.

A configuration and an installation position of a switching valve V2 of the shock absorber D6 with the vehicle height adjustment function according to the second modification of the second embodiment are different from those of the shock absorber D1 with the vehicle height adjustment function according to the first embodiment.

In the shock absorber D6 with the vehicle height adjustment function, the switching valve V2 is provided partway in the fourth passage 31 and the fifth passage 32, and the connection between the extension side chamber R1, the compression side chamber R2, and the damper circuit C2, the connection between the extension side chamber R1 and the pump passage 20, and the connection between the compression side chamber R2 and the pump passage 20 are selectively switched by switching the switching valve V2. In the shock absorber D6 with the vehicle height adjustment function, the vehicle height adjustment mode includes two modes including a mode for increasing the vehicle height and a mode for lowering the vehicle height, and it is possible to switch the mode to the mode for increasing the vehicle height and the mode for lowering the vehicle height by switching the switching valve V2, and the damper mode can be selected.

The configuration of the switching valve V2 is similar to that of the switching valve V2 of the shock absorber D3 with the vehicle height adjustment function according to the second modification of the first embodiment. Then, the switching valve V2 connects the ports a1 and t1 to the partway in the fourth passage 31, is provided partway in the fourth passage 31 and on the side of the extension side chamber than the second extension side damping valve 34 and the second extension side check valve 35, connects the ports b1 and t2 to the partway in the fifth passage 32, is provided partway in the fifth passage 32 and on the side of the compression side chamber than the second compression side damping valve 36 and the second compression side check valve 37, and connects the port p1 to another end of the pump passage 20.

When the solenoid 28 is not energized, the valve body 26 takes the neutral position 26b by the springs 27a and 27b, connects the ports a1 and t1 so as to communicate the fourth passage 31, connects the ports b1 and t2 so as to communicate the fifth passage 32, and closes the port p1 so as to block the other end of the pump passage 20.

Furthermore, when being pushed rightward by energizing the solenoid 28, the valve body 26 takes the left position 26a, closes the port t1 so as to block the fourth passage 31, connects the ports a1 and p1 so as to communicate the pump passage 20 with the extension side chamber R1, and connects the ports b1 and t2 so as to communicate the fifth passage 32.

Furthermore, when being pushed leftward by energizing the solenoid 28, the valve body 26 takes the right position 26c, closes the port t2 so as to block the fifth passage 32, connects the ports b1 and p1 so as to communicate the pump passage 20 with the compression side chamber R2, and connects the ports a1 and t1 so as to communicate the fourth passage 31.

Therefore, in a case where the switching valve V2 takes the neutral position 26b without energizing the solenoid 28, the pump passage 20 is blocked, and the shock absorber main body 1 is connected to the damper circuit C2 via the fourth passage 31 and the fifth passage 32, and this enables the damper circuit C2. Accordingly, the shock absorber D6 with the vehicle height adjustment function is in the damper mode.

On the other hand, in a case where the solenoid 28 is energized and the switching valve V2 is switched to the left position 26a, the fourth passage 31 is blocked, the pump passage 20 is connected to the extension side chamber R1 so as to enable the pump P, the compression side chamber R2 is connected to the damper circuit C2 via the fifth passage 32, and the shock absorber D6 with the vehicle height adjustment function is in the vehicle height adjustment mode in which the vehicle height is lowered. Moreover, in a case where the solenoid 28 is energized and the switching valve V2 is switched to the right position 26c, the fifth passage 32 is blocked, the pump passage 20 is connected to the compression side chamber R2 so as to enable the pump P, the extension side chamber R1 is connected to the damper circuit C2 via the fourth passage 31, and the shock absorber D6 with the vehicle height adjustment function is in the vehicle height adjustment mode in which the vehicle height is increased. In this way, the switching valve V2 can switch the mode of the shock absorber D6 with the vehicle height adjustment function by selecting one of the damper mode in which only the damper circuit C2 is enabled and the vehicle height adjustment mode in which the vehicle height is lowered while the pump P is enabled, and the vehicle height adjustment mode in which the vehicle height is increased while the pump P is enabled.

Note that, in the shock absorber D6 with the vehicle height adjustment function according to the present embodiment, the shock absorber main body 1 includes the relief passage 9 that connects the extension side chamber R1 to the compression side chamber R2, and a relief valve 102 that is provided in the relief passage 9, opens when the pressure of the extension side chamber R1 is higher than the pressure of the compression side chamber R2 and a difference between the pressure of the extension side chamber R1 and the pressure of the compression side chamber R2 reaches a valve opening pressure and allows the flow of the hydraulic oil (liquid) from the extension side chamber R1 toward the compression side chamber R2, and opens when the pressure of the compression side chamber R2 is higher than the pressure of the extension side chamber R1 and the difference between the pressure of the compression side chamber R2 and the pressure of the extension side chamber R1 reaches the valve opening pressure and allows the flow of the hydraulic oil (liquid) from the compression side chamber R2 toward the extension side chamber R1. According to the shock absorber D6 with the vehicle height adjustment function configured in this way, even if a situation occurs where the passenger makes the vehicle travel and the shock absorber main body 1 extends in a state where the vehicle height is lowered in the vehicle height adjustment mode, the pressure in the extension side chamber R1 does not become excessive, and in addition, even if a situation occurs where the passenger makes the vehicle travel and shock absorber main body 1 contracts in a state where the vehicle height is increased in the vehicle height adjustment mode, the pressure in the compression side chamber R2 does not become excessive, and the shock absorber D3 D6 with the vehicle height adjustment function is protected.

The shock absorber D6 with the vehicle height adjustment function according to the second modification of the second embodiment is configured as described above, and an operation will be described below. First, an operation in a case where the switching valve V2 selects the neutral position 26*b* and the shock absorber D6 with the vehicle height adjustment function is in the damper mode will be described. In this state, a connection state between the shock absorber main body 1 and the damper circuit C2 in the shock absorber D4 with the vehicle height adjustment function is the same as a connection state between the shock absorber main body 1 and the damper circuit C2 in the shock absorber D4 with the vehicle height adjustment function according to the second embodiment in the damper mode. Therefore, in a case where the shock absorber D6 with the vehicle height adjustment function according to the second modification of the second embodiment is in the damper mode, if the operation similar to that of the shock absorber D4 with the vehicle height adjustment function according to the second embodiment in the damper mode is performed and the shock absorber main body 1 is contracted by the external force, the shock absorber D6 generates a damping force that prevents the expansion/contraction of the shock absorber main body 1.

Subsequently, an operation in a case where the switching valve V2 selects the left position 26*a* and the shock absorber D6 with the vehicle height adjustment function is in the vehicle height adjustment mode in which the vehicle height is lowered will be described. In this state, a connection state between the shock absorber main body 1, the pump P, and the damper circuit C2 in the shock absorber D6 with the vehicle height adjustment function is the same as the connection state between the shock absorber main body 1, the pump P, and the damper circuit C2 in the shock absorber D4 with the vehicle height adjustment function according to the second embodiment in the state of the vehicle height adjustment mode. Therefore, in a case where the shock absorber D6 with the vehicle height adjustment function according to the second modification of the second embodiment is in the vehicle height adjustment mode in which the vehicle height is lowered, an operation similar to the operation of the shock absorber D4 with the vehicle height adjustment function according to the second embodiment in the vehicle height adjustment mode may be performed, and the shock absorber main body 1 may be contracted by driving the pump P so as to lower the vehicle height. If the switching valve V2 is switched to the neutral position 26*b* and the shock absorber D6 with the vehicle height adjustment function is set to be in the damper mode after lowering the vehicle height, the hydraulic oil in the extension side chamber R1 is connected to the compression side chamber R2 and the reservoir R via the damper circuit C2, and the extension of the shock absorber main body 1 is allowed. Therefore, the shock absorber main body 1 returns to an original displacement state before the vehicle height is lowered, with a resilient force of the suspension spring S.

Moreover, an operation in a case where the switching valve V2 selects the right position 26*c* and the shock absorber D6 with the vehicle height adjustment function is in the vehicle height adjustment mode in which the vehicle height is increased will be described. In this state, the connection state between the shock absorber main body 1, the pump P, and the damper circuit C2 in the shock absorber D6 with the vehicle height adjustment function is the same as the connection state between the shock absorber main body 1, the pump P, and the damper circuit C2 in the shock absorber D5 with the vehicle height adjustment function according to the first modification of the second embodiment in the state of the vehicle height adjustment mode. Therefore, in a case where the shock absorber D6 with the vehicle height adjustment function according to the second modification of the second embodiment is in the vehicle height adjustment mode in which the vehicle height is increased, an operation similar to that of the shock absorber D5 with the vehicle height adjustment function according to the first modification of the second embodiment in the vehicle height adjustment mode may be performed, the shock absorber main body 1 may be extended by driving the pump P so as to increase the vehicle height. If the switching valve V2 is switched to the neutral position 26*b* and the shock absorber D6 with the vehicle height adjustment function is set to be in the damper mode after increasing the vehicle height, the hydraulic oil in the compression side chamber R2 can move to the extension side chamber R1 and the reservoir R through the damper circuit C2, and the contraction of the shock absorber main body 1 is allowed. Therefore, the shock absorber main body 1 contracts and receives the load of the vehicle body, and returns to an original displacement state before the vehicle height is increased.

As described above, the shock absorbers D4 to D6 with the vehicle height adjustment function according to the present embodiment includes the shock absorber main body 1 including the cylinder 2 filled with the hydraulic oil (liquid), the piston 3 that is movably inserted into the cylinder 2 and partitions the inside of the cylinder 2 into the extension side chamber R1 and the compression side chamber R2, and the piston rod 4 that is movably inserted into the cylinder 2 and is coupled to the piston 3, the suspension spring S that biases the shock absorber main body 1 in the extending direction, the reservoir R that accumulates the hydraulic oil (liquid), the damper circuit C1 that is connected to the extension side chamber R1, the compression side chamber R2, and the reservoir R and generates a damping force in the shock absorber main body 1 at the time when the shock absorber main body 1 expands/contracts, the pump P that can suck the liquid from the reservoir R and discharge the liquid, and the switching valves V1 and V2 that are installed between the shock absorber main body 1, the damper circuit C1, and the pump P and can switch the mode between the damper mode in which the damping force is generated in the shock absorber main body 1 by connecting the shock absorber main body 1 to the damper circuit C1 and the vehicle height adjustment mode in which the shock absorber main body 1 is connected to the pump P.

In the shock absorbers D4 to D6 with the vehicle height adjustment function configured in this way, since the damper circuit C2 and the pump P can be selectively enabled by the switching valves V1 and V2, the reservoir R used to supply and discharge the hydraulic oil (liquid) that becomes excessive or insufficient in the cylinder 2 when the shock absorber main body 1 generates the damping force can be used as a tank that accumulates the hydraulic oil (liquid) to be supplied into the shock absorber main body 1 when the vehicle height is adjusted. Furthermore, in the shock absorbers D4 to D6 with the vehicle height adjustment function configured in this way, since the pump P is driven to supply the hydraulic oil (liquid) into the shock absorber main body 1 and the shock absorber main body 1 can be extended or contracted or expanded/contracted, there is no need to include a jack for driving the spring seat of the suspension spring S.

As described above, according to the shock absorbers D4 to D6 with the vehicle height adjustment function configured in this way, a jack and a tank for the jack that are necessary for the typical shock absorber with the vehicle height adjustment function are not necessary. Therefore, even if the shock absorbers D4 to D6 have the vehicle height adjustment function, the shock absorbers D4 to D6 can be miniaturized.

Furthermore, in the shock absorbers D4 to D6 with the vehicle height adjustment function according to the present embodiment, in the state of the vehicle height adjustment mode, the switching valves V1 and V2 connect the pump P to one of the extension side chamber R1 and the compression side chamber R2 of the shock absorber main body 1, and connects the other one of the extension side chamber R1 and the compression side chamber R2 to the reservoir R via the damper circuit C2. According to the shock absorbers D4 to D6 with the vehicle height adjustment function configured in this way, since the chamber to be compressed that is one of the extension side chamber R1 and the compression side chamber R2 is connected to the reservoir R by using the damper circuit C2 at the time of vehicle height adjustment, it is not necessary to include a passage that communicates the compression side chamber with the reservoir R for only vehicle height adjustment. Therefore, the shock absorbers D4 to D6 can be further miniaturized.

Furthermore, in the shock absorbers D4 to D6 with the vehicle height adjustment function according to the present embodiment, the damper circuit C2 includes the fourth passage 31 of which one end is connected to the extension side chamber R1, the fifth passage 32 that connects the compression side chamber R2 to the other end of the fourth passage 31, the sixth passage 33 that connects the second connection point J2 that is the connection point between the fourth passage 31 and the fifth passage 32 to the reservoir R, the second extension side damping valve 34 that is provided in the fourth passage 31 and gives a resistance to the flow of the hydraulic oil from the extension side chamber R1 toward the second connection point J2, the second extension side check valve 35 that is provided in the fourth passage 31 in parallel to the second extension side damping valve 34 and allows only the flow of the hydraulic oil from the second connection point J2 toward the extension side chamber R1, the second compression side damping valve 36 that is provided in the fifth passage 32 and gives a resistance to the flow of the hydraulic oil from the compression side chamber R2 toward the second connection point J2, and the second compression side check valve 37 that is provided in the fifth passage 32 in parallel to the second compression side damping valve 36 and allows only the flow of the hydraulic oil from the second connection point J2 toward the compression side chamber R2. According to the shock absorbers D4 to D6 with the vehicle height adjustment function configured in this way, when the vehicle height adjustment mode is switched to the damper mode, the shock absorber main body 1 extends or contracts, and the vehicle height is returned to the original state before the vehicle height adjustment, the second extension side damping valve 34 or the second compression side damping valve 36 gives a resistance to the flow of the hydraulic oil (liquid). Therefore, the expansion/contraction of the shock absorber main body 1 becomes slower, and it is not necessary to make the passenger feel uncomfortable.

Moreover, in a case where the switching valve V1 has the first position 23a where the fourth passage 31 is communicated and the connection between the pump P and the shock absorber main body 1 is disconnected in the damper mode and the second position 23b where the fourth passage 31 is blocked and the pump P is connected to the shock absorber main body 1 in the vehicle height adjustment mode, the shock absorber D4 with the vehicle height adjustment function may make the shock absorber main body 1 contract in the vehicle height adjustment mode so as to lower the vehicle height. Furthermore, in a case where the switching valve V1 has the first position 23a where the fifth passage 32 is communicated and the connection between the pump P and the shock absorber main body 1 is disconnected in the damper mode and the second position 23b where the fifth passage 32 is blocked and the pump P is connected to the shock absorber main body 1 in the vehicle height adjustment mode, the shock absorber D5 with the vehicle height adjustment function may raise the shock absorber main body 1 in the vehicle height adjustment mode and increase the vehicle height. Then, in addition, in a case where the switching valve V2 selectively takes two positions including the neutral position 26b where the fourth passage 31 is communicated with the fifth passage 32 and the connection between the pump P and the shock absorber main body 1 is disconnected in the damper mode, the left position 26a where the fourth passage 31 is blocked and the pump P is connected to the shock absorber main body 1 in the vehicle height adjustment mode, and the right position 26c where the fifth passage 32 is blocked and the pump P is connected to the shock absorber main body 1, the shock absorber D6 with the vehicle height adjustment function may raise or lower the shock absorber main body 1 in the vehicle height adjustment mode and may increase and lower the vehicle height.

Furthermore, in the shock absorbers D4 and D6 with the vehicle height adjustment function according to the present embodiment, the shock absorber main body 1 includes the relief passage 9 that connects the extension side chamber R1 to the compression side chamber R2 and the relief valves 10 and 102 that is provided in the relief passage 9, open when the differential pressure between the extension side chamber R1 and the compression side chamber R2 reaches the valve opening pressure, and allow the flow of the hydraulic oil (liquid) from the extension side chamber R1 toward the compression side chamber R2. According to the shock absorbers D4 and D6 with the vehicle height adjustment function configured in this way, even if a situation occurs where the passenger makes the vehicle travel and the shock absorber main body 1 extends in a state where the vehicle height is lowered in the vehicle height adjustment mode, the pressure in the extension side chamber R1 does not become excessive, and the shock absorbers D4 and D6 with the vehicle height adjustment function are protected. Moreover, in the shock absorbers D5 and D6 with the vehicle height adjustment function according to the present embodiment, the shock absorber main body 1 includes the relief passage 9 that connects the extension side chamber R1 to the compression side chamber R2 and the relief valves 101 and 102 that are provided in the relief passage 9, open when the differential pressure between the compression side chamber R2 and the extension side chamber R1 reaches the valve opening pressure, and allow the flow of the hydraulic oil (liquid) from the compression side chamber R2 toward the extension side chamber R1. According to the shock absorbers D5 and D6 with the vehicle height adjustment function configured in this way, even if a situation occurs where the passenger makes the vehicle travel and the shock absorber main body 1 contracts in a state where the vehicle height is increased in the vehicle height adjustment mode, the pressure in the compression side chamber R2 does no become excessive, and the shock absorbers D5 and D6 with the vehicle height adjustment function are protected.

Third Embodiment

Figure 7:
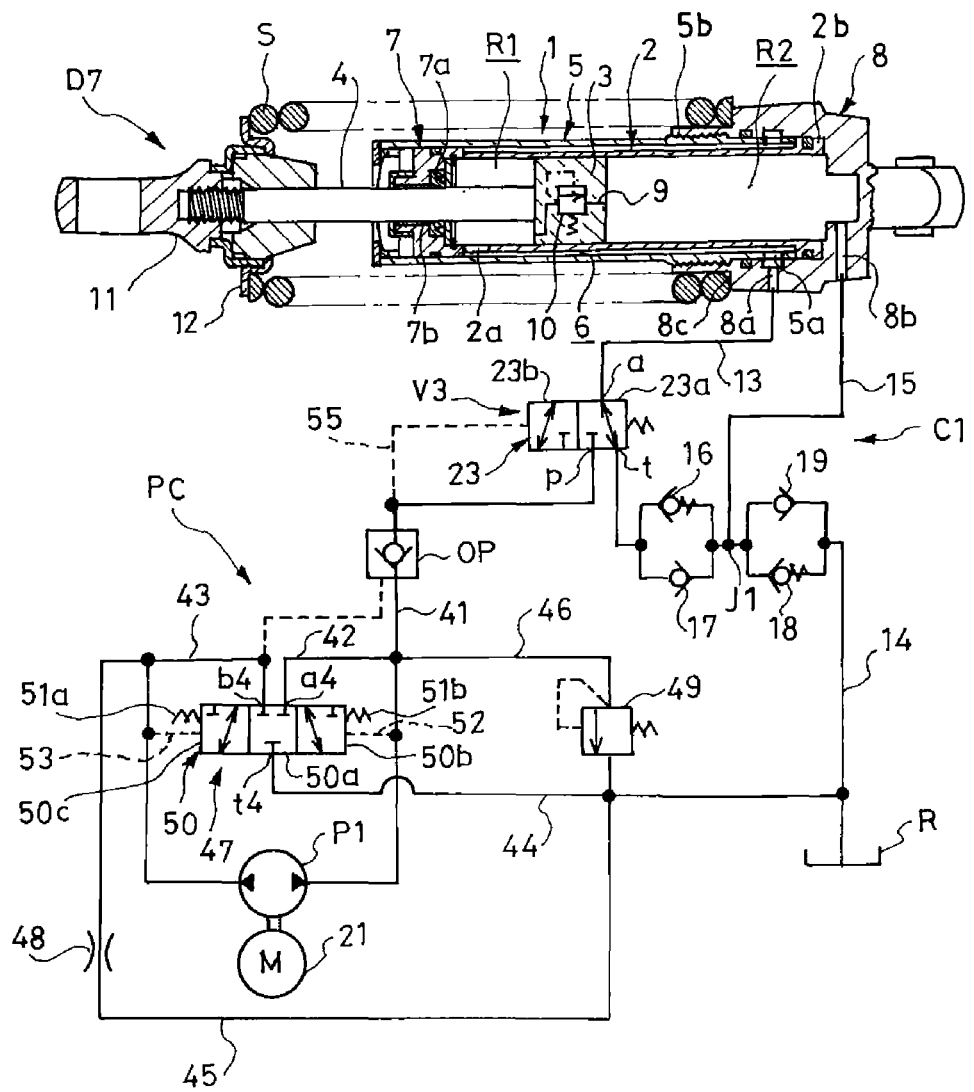
FIG. 7 is a diagram illustrating a shock absorber with a vehicle height adjustment function according to a third embodiment.

As illustrated in FIG. 7, a shock absorber D7 with a vehicle height adjustment function according to a third embodiment includes a shock absorber main body 1, a suspension spring S that biases the shock absorber main body 1 in an extending direction, a reservoir R that accumulates liquid, a damper circuit C1, a pump P1 that can bidirectionally discharge liquid, a pump circuit PC, and a switching valve V3. The shock absorber D7 with the vehicle height adjustment function according to the third embodiment further includes a pump circuit PC and has different configurations of the pump P1 and the switching valve V3 from those of the shock absorber D1 with the vehicle height adjustment function according to the first embodiment.

The pump circuit PC includes a supply passage 41 that has one end connected to the switching valve V3 and in which the bidirectional discharge type pump P1 is provided partway in, an operation check valve OV that is provided partway in the supply passage 41 and on the side of the switching valve V3 than the pump P1, a first switching passage 42 of which one end is connected to the partway in the supply passage 41 and between the pump P1 and the operation check valve OV, a second switching passage 43 of which one end is connected to the partway in the supply passage 41 and on a side of a reverse switching valve than the pump P1, a suction passage 44 of which one end is connected to the reservoir R, a return passage 45 of which one end is connected to the reservoir R and another end is connected to the partway in the supply passage 41 and on the side of the reverse switching valve than the pump P, a relief passage for pump 46 of which one end is connected to the reservoir R and another end is connected to the partway in the supply passage 41 and between the pump P and the operation check valve OV, a direction switching valve 47 that switches a connection state between the first switching passage 42, the second switching passage 43, and the suction passage 44, an orifice 48 provided in the return passage 45, and a relief valve for pump 49 provided in the relief passage for pump 46.

The one end of the supply passage 41 is connected to the switching valve V3, and the supply passage 41 is connected to the operation check valve OV. The pump P1 is a bidirectional discharge type pump and is driven by a motor 21, discharges pressure oil toward the switching valve V3 via the operation check valve OV at the time of forward rotation and supplies the pressure oil to the operation check valve OV as a pilot pressure at the time of reverse rotation. Note that, although the pump P1 is assumed as a gear pump, various types can be used as long as the pump is a pump that can perform bidirectional discharge.

In a state where the pilot pressure does not act, the operation check valve OV allows only a flow of hydraulic oil that passes through the supply passage 41 from the pump P1 toward the switching valve V3 and prevents a reverse flow. However, when the pilot pressure acts from the pump P1, the operation check valve OV opens and allows not only the flow of the hydraulic oil that passes through the supply passage 41 from the pump P1 toward the switching valve V3 but also a flow of the hydraulic oil from the switching valve V3 toward the pump P1.

The direction switching valve 47 is a three-port three-position direction switching valve including three ports a4, b4, and t4, the port a4 is connected to another end of the first switching passage 42, the port b4 is connected to another end of the second switching passage 43, and the port t4 is connected to another end of the suction passage 44.

Specifically, the direction switching valve 47 includes a valve body 50 that has a neutral position 50a where the ports a4, b4, and t4 are blocked, a supply position 50b where the ports b4 and t4 are connected so as to communicate the second switching passage 43 with the reservoir R via the suction passage 44 and block the port a4, and a discharge position 50c where the ports a4 and t4 are connected to communicate the first switching passage 42 with the reservoir R via the suction passage 44 and block the port b4, springs 51a and 51b that sandwich the valve body 50 so as to make the valve body 50 take the neutral position 50a and bias the valve body 50 from both sides, a first pilot passage 52 that causes a pressure in the supply passage 41 between the pump P1 and the operation check valve OV to act as the pilot pressure so that the valve body 50 takes the supply position 50b, and a second pilot passage 53 that causes a pressure in the supply passage 41 on the side of the reverse switching valve than the pump P1 to act as the pilot pressure so that the valve body 50 takes the discharge position 50c.

The pump circuit PC is configured as described above, and an operation will be described below. When the motor 21 is driven to rotate the pump P1 forward, a pressure in the supply passage 41 on the side of the switching valve than the pump P1 is increased by driving the pump P1. Therefore, the direction switching valve 47 is switched from the neutral position 50a to the supply position 50b. Then, since the side of the supply passage 41 closer to the reverse switching valve than the pump P1 is connected to the reservoir R via the second switching passage 43 and the suction passage 44, the pump P1 sucks the hydraulic oil from the reservoir R and discharges the hydraulic oil toward the switching valve V3. The hydraulic oil discharged from the pump P1 pushes and opens the operation check valve OV and moves to the switching valve V3. Note that, when the pressure in the supply passage 41 on the side of the switching valve than the pump P1 becomes excessive due to the forward rotation of the pump P1, the relief valve for pump 49 opens, and the hydraulic oil is discharged to the reservoir R via the relief passage for pump 46. Therefore, the pump circuit PC is protected.

Conversely, when the motor 21 is driven to reversely rotate the pump P1, the pressure in the supply passage 41 on the side of the reverse switching valve than the pump P1 is increased by driving the pump P1. Therefore, the direction switching valve 47 is switched from the neutral position 50a to the discharge position 50c. Then, since the side of the supply passage 41 closer to the switching valve than the pump P1 is connected to the reservoir R via the first switching passage 42 and the suction passage 44, the pump P1 sucks the hydraulic oil from the reservoir R and discharges the hydraulic oil. Since the hydraulic oil discharged from the pump P1 passes through the orifice 48 in the return passage 45 and is returned to the reservoir R, the pressure in the supply passage 41 on the side of the reverse switching valve of the pump P1 increases only by a pressure loss of the orifice 48 and acts as the pilot pressure of the operation check valve OV. The operation check valve OV that has received the pilot pressure opens and allows the hydraulic oil to flow from the switching valve V3 toward the pump P1 between the switching valve V3 to the pump P1 in the supply passage 41.

Subsequently, the switching valve V3 is different from the switching valve V1 in that the switching valve V3 includes a pilot passage 55 that guides a discharge pressure of the pump P1 as the pilot pressure, instead of the solenoid 25. Therefore, while the switching valve V3 includes the valve body 23 and the spring 24 as in the switching valve V1, the switching valve V3 includes the pilot passage 55 that guides the discharge pressure of the pump P1 as the pilot pressure instead of the solenoid. Then, the port p of the switching valve V3 is connected to one end of the supply passage 41, and the pilot passage 55 makes the pressure in partway in the supply passage 41 and between the switching valve V3 and the operation check valve OV act on the valve body 23 to take a second position 23b, as the pilot pressure.

When the pump P1 is rotated forward, the position of the direction switching valve 47 is switched to the supply position 50b, the hydraulic oil discharged from the pump P1 flows through the supply passage 41 toward the switching valve V3, and the pressure between the pump P1 and the switching valve V3 in the supply passage 41 increases. Therefore, the position of the switching valve V3 is switched to the second position 23b. Therefore, when the pump P1 is rotated forward, the position of the switching valve V3 is automatically switched to the second position 23b in response to input of the pilot pressure, the mode of the shock absorber main body 1 is switched to the vehicle height adjustment mode, and the hydraulic oil is supplied to the extension side chamber R1.

Furthermore, if the pump P1 is stopped after being rotated forward, the position of the direction switching valve 47 is switched to the neutral position 50a, the operation check valve OV opens, a pressure in a section between the switching valve V3 and the operation check valve OV in the supply passage 41 becomes high, and the switching valve V3 maintains to be in the second position 23b. That is, even if the pump P1 is stopped after being rotated forward, the shock absorber main body 1 maintains to be in the vehicle height adjustment mode. When the pump P1 is reversely rotated from this state, the hydraulic oil discharged from the pump P1 flows through the return passage 45 toward the reservoir R, the position of the direction switching valve 47 is switched to the discharge position 50c, the switching valve side of the supply passage 41 than the pump P1 is connected to the reservoir R. Therefore, the operation check valve OV opens, the pilot pressure that has acted on the switching valve V3 is eliminated, the position of the switching valve V3 is switched to a first position 23a, and the mode of the shock absorber main body 1 is returned to the damper mode. In a case where the mode of the shock absorber main body 1 is returned to the damper mode, it is sufficient to switch the position of the switching valve V3 from the second position 23b to the first position 23a. That is, it is sufficient to temporarily open the operation check valve OV so as to reduce the pressure between the switching valve V3 and the operation check valve OV in the supply passage 41 that has been high due to the forward rotation of the pump P1. Therefore, the reverse drive of the pump P1 only needs to be performed for a very short time.

In a state where the pump P1 is stopped after the position of the switching valve V3 is switched to the first position 23a, the direction switching valve 47 takes the neutral position 50a, and the pressure in the supply passage 41 on the side of the switching valve than the pump P1 is not increased. Therefore, the switching valve V3 takes the first position 23a and maintains the damper mode of the shock absorber main body 1.

That is, if the pump P1 is not driven in a state of the damper mode, the switching valve V3 takes the first position 23a, the pump circuit PC is blocked, and the shock absorber main body 1 is connected to the damper circuit C1 via a first passage 13 and a third passage 15 so as to enable the damper circuit C1, and the shock absorber D7 with the vehicle height adjustment function maintains to be in the damper mode.

On the other hand, if the pump P1 is rotated forward in a state of the damper mode, the position of the switching valve V3 is switched to the second position 23b by the pilot pressure received from the pump P1, the first passage 13 is blocked, the supply passage 41 is connected to the extension side chamber R1 to as to enable the pump P1, the compression side chamber R2 is connected to the damper circuit C1 via the third passage 15, and the shock absorber D7 with the vehicle height adjustment function is set to be in the vehicle height adjustment mode in which the vehicle height is lowered. When the pump P1 is stopped after being rotated forward, the operation check valve OV is closed, the high pressure between the operation check valve OV and the switching valve V3 in the supply passage 41 is maintained, and the switching valve V3 keeps to take the second position 23b. Therefore, the shock absorber D7 with the vehicle height adjustment function maintains to be in the vehicle height adjustment mode.

In order to return the shock absorber D7 with the vehicle height adjustment function in the vehicle height adjustment mode to the damper mode, the pump P1 is reversely rotated, the operation check valve OV is opened, the pressure between the switching valve V3 and the operation check valve OV is released, and the position of the switching valve V3 is switched to the first position 23a. Then, the switching valve V3 takes the first position 23a, blocks the pump circuit PC, and connects the shock absorber main body 1 to the damper circuit C1 via the first passage 13 and the third passage 15. Therefore, the communication between the pump P1 and the extension side chamber R1 is disconnected, the damper circuit C1 is enabled, and the shock absorber D7 with the vehicle height adjustment function returns to the damper mode.

In this way, since the position of the switching valve V3 is switched to the second position 23b by rotating the pump P1 forward in a case where the switching valve V3 takes the first position 23a and is switched to the first position 23a by reversely rotating the pump P1 in a case where the switching valve V3 takes the second position 23b, the shock absorber D7 with the vehicle height adjustment function can automatically switch the switching valve V3 by driving the pump P1 and can switch the damper mode in which only the damper circuit C1 is enabled and the vehicle height adjustment mode in which the pump P1 is enabled and the vehicle height is lowered.

Then, in a case where the shock absorber D7 with the vehicle height adjustment function according to the third embodiment is in the damper mode, the connection state between the shock absorber main body 1 and the damper circuit C1 in the shock absorber D6 with the vehicle height adjustment function is the same as the connection state between the shock absorber main body 1 and the damper circuit C1 in the shock absorber D1 with the vehicle height adjustment function according to the first embodiment in the state of the damper mode. Therefore, in a case where the shock absorber D7 with the vehicle height adjustment function according to the third embodiment is in the damper mode, the operation similar to that of the shock absorber D1 with the vehicle height adjustment function according to the first embodiment in the damper mode is operated, and the shock absorber main body 1 is expanded/contracted by the external force. Then, the damping force for preventing the expansion/contraction of the shock absorber main body 1 is generated.

Subsequently, an operation in a case where the pump P1 is rotated forward, the switching valve V3 selects the second position 23b, and the shock absorber D7 with the vehicle height adjustment function is set to be in the vehicle height adjustment mode in which the vehicle height is lowered will be described. In this state, the hydraulic oil is supplied from the pump P1 to the extension side chamber R1 of the shock absorber main body 1 in the shock absorber D7 with the vehicle height adjustment function, and the connection state between the shock absorber main body 1 and the damper circuit C1 is the same as the connection state between the shock absorber main body 1 and the damper circuit C1 in the shock absorber D1 with the vehicle height adjustment function according to the first embodiment in the state of the vehicle height adjustment mode. Therefore, the shock absorber D7 with the vehicle height adjustment function according to the third embodiment may automatically switch the switching valve V3 by driving the pump P1 forward so as to contract the shock absorber main body 1 and lower the vehicle height. When the pump P1 is stopped after the vehicle height is lowered, the hydraulic oil is not supplied from the pump P1 to the extension side chamber R1. However, while the switching valve V3 keeps to take the second position 23b and the extension side chamber R1 is closed, the compression side chamber R2 communicates with the reservoir R via the damper circuit C1. Therefore, if the pump P1 is stopped after rotating the pump P1 forward, the shock absorber D7 with the vehicle height adjustment function maintains the shock absorber main body 1 to be in a contracted state by adjusting the vehicle height.

Thereafter, if the pump P1 is reversely rotated, the position of the switching valve V3 is switched to the first position 23a, and the shock absorber D7 with the vehicle height adjustment function is set to be in the damper mode, the extension side chamber R1 is connected to the compression side chamber R2 and the reservoir R via the damper circuit C1, and the extension of the shock absorber main body 1 is allowed. Therefore, the shock absorber main body 1 returns to an original displacement state before the vehicle height is lowered, by the resilient force of the suspension spring S.

As described above, the shock absorber D7 with the vehicle height adjustment function according to the present embodiment includes the shock absorber main body 1 including the cylinder 2 filled with the hydraulic oil (liquid), the piston 3 that is movably inserted into the cylinder 2 and partitions the inside of the cylinder 2 into the extension side chamber R1 and the compression side chamber R2, and the piston rod 4 that is movably inserted into the cylinder 2 and is coupled to the piston 3, the suspension spring S that biases the shock absorber main body 1 in the extending direction, the reservoir R that accumulates the hydraulic oil (liquid), the damper circuit C1 that is connected to the extension side chamber R1, the compression side chamber R2, and the reservoir R and generates a damping force in the shock absorber main body 1 at the time when the shock absorber main body 1 expands/contracts, the pump P1 that can suck the liquid from the reservoir R and discharge the liquid, and the switching valve V3 that is installed between the shock absorber main body 1, the damper circuit C1, and the pump P and can switch the mode between the damper mode in which the damping force is generated in the shock absorber main body 1 by connecting the shock absorber main body 1 to the damper circuit C1 and the vehicle height adjustment mode in which the shock absorber main body 1 is connected to the pump P1.

In the shock absorber D7 with the vehicle height adjustment function configured in this way, since the damper circuit C1 and the pump P1 can be selectively enabled by the switching valve V3, the reservoir R used to supply and discharge the hydraulic oil (liquid) that becomes excessive or insufficient in the cylinder 2 when the shock absorber main body 1 generates the damping force can be used as a tank that accumulates the hydraulic oil (liquid) to be supplied into the shock absorber main body 1 when the vehicle height is adjusted. Furthermore, in the shock absorber D7 with the vehicle height adjustment function configured in this way, since the pump P1 is driven to supply the hydraulic oil (liquid) into the shock absorber main body 1 and the shock absorber main body 1 can be extended or contracted or expanded/contracted, there is no need to include a jack for driving the spring seat of the suspension spring S.

As described above, according to the shock absorber D7 with the vehicle height adjustment function configured in this way, a jack and a tank for the jack that are necessary for the typical shock absorber with the vehicle height adjustment function are not necessary. Therefore, even if the shock absorber D7 has the vehicle height adjustment function, the shock absorber D7 can be miniaturized.

Furthermore, in the shock absorber D7 with the vehicle height adjustment function according to the present embodiment, in the state of the vehicle height adjustment mode, the switching valve V3 connects the pump P to one of the extension side chamber R1 and the compression side chamber R2 of the shock absorber main body 1, and connects the other one of the extension side chamber R1 and the compression side chamber R2 to the reservoir R via the damper circuit C1. According to the shock absorber D7 with the vehicle height adjustment function configured in this way, since the chamber to be compressed that is one of the extension side chamber R1 and the compression side chamber R2 is connected to the reservoir R by using the damper circuit C1 at the time of vehicle height adjustment, it is not necessary to include a passage that communicates the compression side chamber with the reservoir R for only vehicle height adjustment. Therefore, the shock absorber D7 can be further miniaturized.

Moreover, in the shock absorber D7 with the vehicle height adjustment function according to the present embodiment, the pump P1 can perform bidirectional discharge, and the switching valve V3 is configured to switch to the vehicle height adjustment mode using a discharge pressure of the pump P1 as the pilot pressure. According to the shock absorber D7 with the vehicle height adjustment function configured in this way, the switching valve V3 can be automatically switched by driving the pump P1. Therefore, the vehicle height adjustment mode and the damper mode can be automatically switched in response to the drive of the pump P1, and it is not necessary to switch the switching valve V3 by the solenoid, and accordingly, it is possible to reduce cost. The pump circuit PC described above is an example, and in an aspect in which the discharge pressure of the pump P1 can be used to switch the switching valve V3, as the pilot pressure, design thereof can be changed. However, regarding the pump circuit PC described above, in a case where the pump P1 is stopped after being rotated forward, the switching valve V3 maintains the second position 23b, and the shock absorber main body 1 can be maintained to be in the extended or contracted state, and accordingly, it is possible to reduce energy consumption because it is not necessary to drive the pump P1 in order to maintain the shock absorber main body 1 to be in the extended or contracted state.

Note that, in a case where it is desired to lower the vehicle height in the vehicle height adjustment mode, if the switching valve V1 is replaced with the switching valve V3 and the pump P1 and the pump circuit PC are provided instead of the pump P, the pump passage 20, and the pump passage check valve 22 for the configuration of the shock absorber D4 with the vehicle height adjustment function according to the second embodiment, it is possible to switch the shock absorber with the vehicle height adjustment function from the damper mode to the vehicle height adjustment mode by rotating the pump P1 forward so as to lower the vehicle height, and the mode can be returned from the vehicle height adjustment mode to the damper mode by reversely rotating the pump P1 thereafter. Moreover, in a case where it is desired to increase the vehicle height in the vehicle height adjustment mode, if the switching valve V1 is replaced with the switching valve V3 and the pump P1 and the pump circuit PC are provided instead of the pump P, the pump passage 20, and the pump passage check valve 22 for the configuration of the shock absorber D2 with the vehicle height adjustment function according to the first modification of the first embodiment or the shock absorber D5 with the vehicle height adjustment function according to the second embodiment, it is possible to switch the shock absorber with the vehicle height adjustment function from the damper mode to the vehicle height adjustment mode by rotating the pump P1 forward so as to increase the vehicle height, and the mode can be returned from the vehicle height adjustment mode to the damper mode by reversely rotating the pump P1 thereafter.

In the configuration of the damper circuit C1 in the shock absorber D7 with the vehicle height adjustment function, a first connection point J1 between the first passage 13 in which a first extension side damping valve 16 and a first extension side check valve 17 are provided in parallel and the second passage 14 in which a first compression side damping valve 18 and a first compression side check valve 19 are provided in parallel is connected to the compression side chamber R2, and the end of the second passage 14 opposite to a first connection point J1 is connected to the reservoir R. Then, an end of the first passage 13 opposite to the first connection point J1 is connected to the extension side chamber R1.

Therefore, when the outer shell 5 is provided on the outer periphery of the cylinder 2 and the annular gap 6 between the cylinder 2 and the outer shell 5 is communicated with the extension side chamber R1, as in the shock absorber D7 with the vehicle height adjustment function according to the present embodiment, the damper circuit C1, the switching valve V3, and the reservoir R can be arranged on the bottom side. Therefore, the damper circuit C1, the switching valve V3, and the reservoir R may be provided in the cap 8 that closes the bottom end of the cylinder 2 and the outer shell 5.

Figure 8:
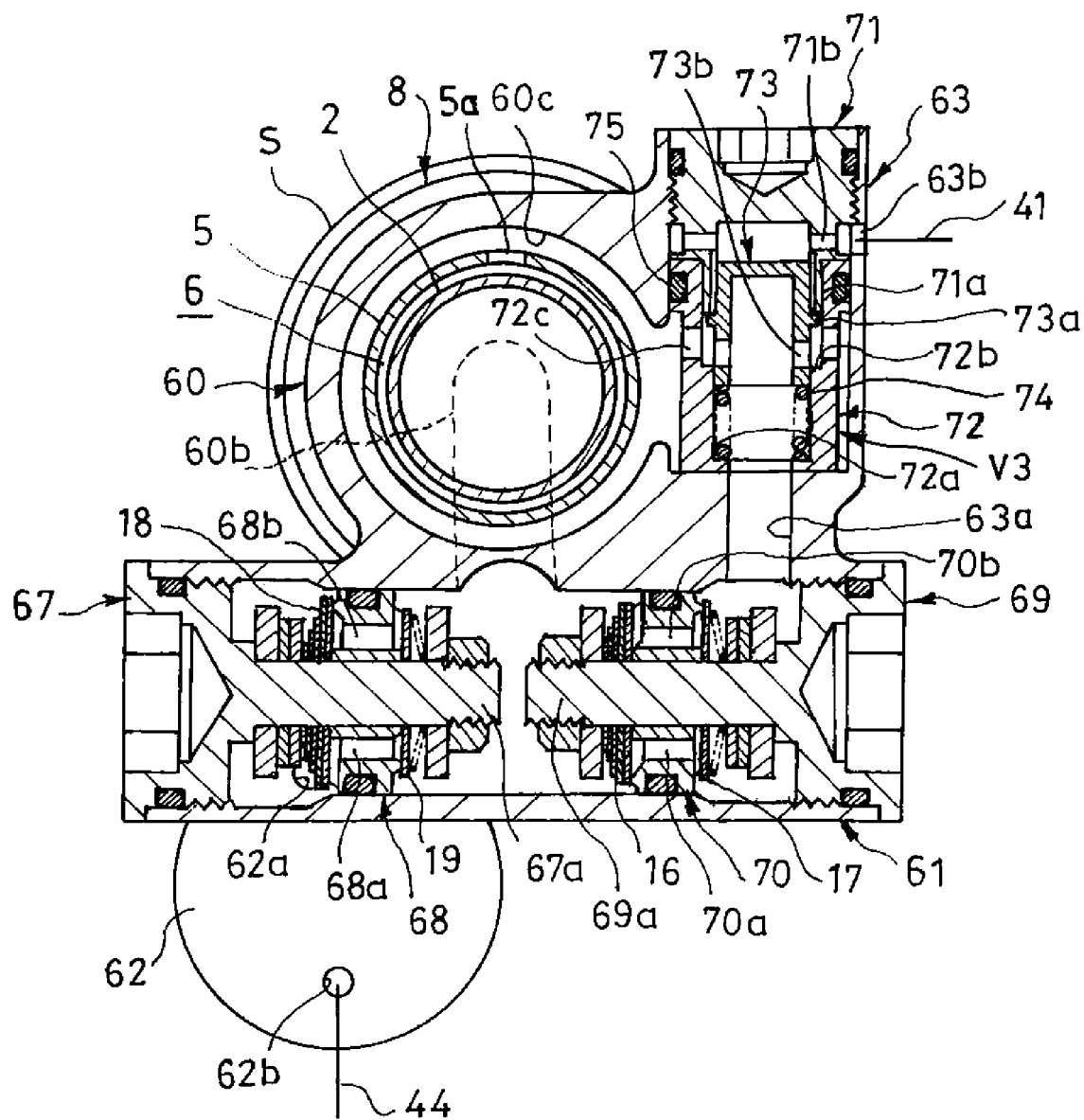
FIG. 8 is a diagram illustrating a structure of a cap in a specific example of the shock absorber with the vehicle height adjustment function according to the third embodiment.
Figure 9:
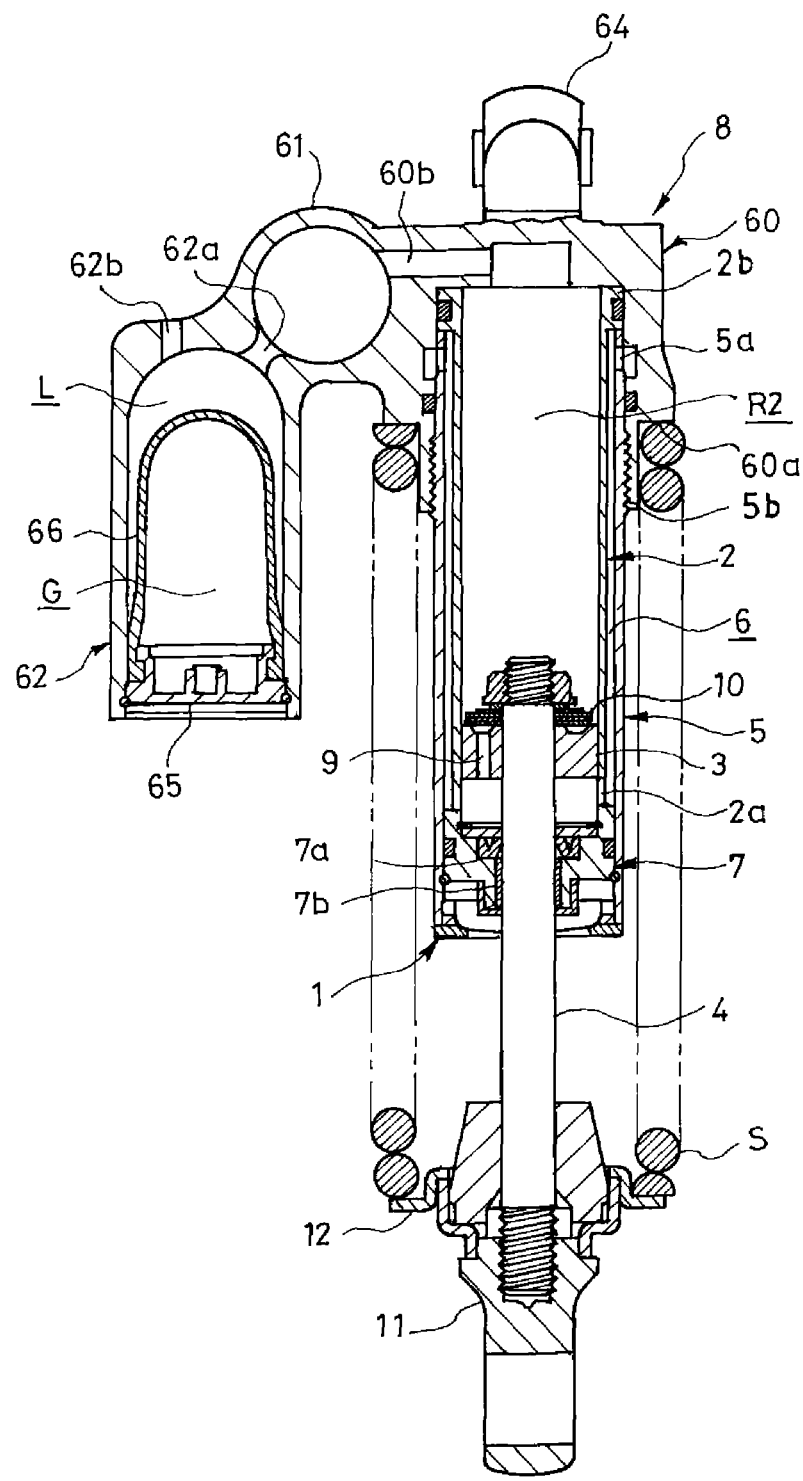
FIG. 9 is a vertical cross-sectional diagram of the specific example of the shock absorber with the vehicle height adjustment function according to the third embodiment.

Specifically, for example, as illustrated in FIGS. 8 and 9, it is sufficient to provide the damper circuit C1, the switching valve V3, and the reservoir R in the cap 8. The cap 8 includes a bottomed cylindrical cap main body 60 that is fitted into the ends of the cylinder 2 and the outer shell 5, a cylindrical first valve housing 61 that is connected to the side of the cap main body 60, a reservoir cylinder 62 connected to the first valve housing 61, a cylindrical second valve housing 63 that is connected to the side of the cap main body 60 and the first valve housing 61, and a bracket 64 that is provided at an end of the cap main body 60 in the axial direction and enables to connect to a vehicle body (not illustrated). Note that, for easy understanding, in FIG. 8, the cap main body 60 and the first valve housing 61 and the second valve housing 63 are displayed as cross sections cut at different levels, and in addition, the first extension side damping valve 16, the first extension side check valve 17, the first compression side damping valve 18, and the first compression side check valve 19 housed in the first valve housing 61 are not illustrated in FIG. 9.

The cap main body 60 has a bottomed cylindrical shape, and an outer periphery of a flange 2b of the cylinder 2 is fitted into the inner periphery. Furthermore, a screw portion 5b provided on the outer periphery of the outer shell 5 is screwed to the inner periphery of the cap main body 60, the flange 2b of the cylinder 2 is sandwiched between the outer shell 5 and the bottom portion of the cap 8, and the cylinder 2 is fixed to the cap 8. Then, the cap main body 60 closes the bottom-side ends of the cylinder 2 and the outer shell 5. Note that the above-described structure for fastening the cylinder 2 and the outer shell 5 to the cap 8 is an example, and another fastening structure may be adopted. Furthermore, the cap main body 60 includes a bottom-side spring seat 60a including an annular step portion provided on the cylinder-side outer periphery.

The first valve housing 61 has a cylindrical shape and is integrated with and connected to the side of the cap main body 60, and is arranged to have a center line on a plane orthogonal to the axis line of the shock absorber main body 1 and at a skew position with respect to the axis line. The exact center of the first valve housing 61 is communicated with the compression side chamber R2 in the cylinder 2 with a port 60b provided in the cap main body 60. The port 60b functions as the third passage in the damper circuit C1. The first extension side damping valve 16, the first extension side check valve 17, the first compression side damping valve 18, and the first compression side check valve 19 are housed in the first valve housing 61.

On the other hand, the reservoir cylinder 62 is connected to the left end side of the first valve housing 61 in FIG. 8 in a posture parallel to the shock absorber main body 1. Furthermore, a lower end opening end of the reservoir cylinder 62 in FIG. 9 is closed with a stopper 65, and the reservoir cylinder 62 is sealed. Then, the reservoir cylinder 62 is filled with compressed gas, a diaphragm 66 attached to the stopper 65 is inserted into the reservoir cylinder 62, and the inside of the reservoir cylinder 62 is partitioned to a gas chamber G in the diaphragm 66 and a liquid chamber L filled with the hydraulic oil, outside the diaphragm 66. Then, the liquid chamber L on the upper side in the reservoir cylinder 62 is communicated with the left side in the first valve housing 61 by a port 62a. The port 62a functions as a part of the second passage in the damper circuit C1. Furthermore, at an upper end of the reservoir cylinder 62 in FIG. 9, a port 62b that connects the liquid chamber L to the suction passage 44 of the pump circuit PC provided outside the reservoir cylinder 62 is provided. Note that, in the stopper 65, a valve (not illustrated) that can inject gas into the diaphragm 66 is provided, the gas can be injected after the diaphragm 66 is inserted into the reservoir cylinder 62, and a pressure in the gas chamber G can be adjusted by the valve.

Moreover, the second valve housing 63 has a bottomed cylindrical shape of which a rear end opens, and the second valve housing 63 from the side to the front end is integrated with the side of the cap main body 60 and the first valve housing 61, is orthogonal to the axis line of the shock absorber main body 1, is orthogonal to the center line of the first valve housing 61 on a plane where the first valve housing 61 is arranged, and is provided to have the center line at a skew position with respect to the axis line of the shock absorber main body 1. The inside of the second valve housing 63 is communicated with the annular gap 6 between the cylinder 2 and the outer shell 5 through a passage 60c provided in the cap main body 60 and a hole 5a provided in the outer shell 5, is communicated with a right side in the first valve housing 61 by a port 63a provided at the front end, and in addition, is communicated with outside by a port 63b provided on a rear end side of the second valve housing 63 than the passage 60c. The annular gap 6 between the cylinder 2 and the outer shell 5, the hole 5a, the passage 60c, and the port 63a form the first passage in the damper circuit C1, and the passage 60c and the port 63a respectively function as ports a and t. Furthermore, the port 63b functions as a port p of the switching valve V3 and is connected to the supply passage 41 in the pump circuit PC.

The cap 8 is configured as described above, as described above, the first extension side damping valve 16, the first extension side check valve 17, the first compression side damping valve 18, and the first compression side check valve 19 are housed in the first valve housing 61, and the switching valve V3 is housed in the second valve housing 63.

A stopper member 67 that closes a left end opening portion of the first valve housing 61 is screwed to the inner periphery at the left end of the first valve housing 61 in FIG. 8. The stopper member 67 includes a shaft 67a that is projected into the first valve housing 61, and to an outer periphery of the shaft 67a, an annular partition member 68, the first compression side damping valve 18 including an annular laminated leaf valve laminated on the left side in FIG. 8 of the partition member 68, and the first compression side check valve 19 including an annular plate laminated on the right side in FIG. 8 of the partition member 68 and a spring member that biases the annular plate to the side of the partition member 68 are attached. Then, the partition member 68 has contact with the inner periphery of the first valve housing 61 and partitions the inside of the first valve housing 61 into a space communicating with the inside of the liquid chamber L via the port 62a and a space communicating with the compression side chamber R2 via the port 60b. Furthermore, the partition member 68 includes ports 68a and 68b that penetrate the partition member 68 in the axial direction, and a space on the left side and a space on the right side in FIG. 8 in the partition member 68 are communicated by the ports 68a and 68b.

The inner periphery of the first compression side damping valve 18 is fixed to the shaft 67a of the stopper member 67, and a deflection on the outer periphery side is allowed. The first compression side damping valve 18 is stacked on the partition member 68 and opens/closes an outlet end of the port 68a. Then, although the first compression side damping valve 18 bends the outer periphery of the port 68a with respect to the flow of the hydraulic oil from the compression side chamber R2 toward the reservoir R, opens the valve, and gives a resistance so as to allow the flow, the first compression side damping valve 18 closes the port 68a and maintains the reverse flow of the hydraulic oil.

The annular plate of the first compression side check valve 19 is slidably attached to the outer periphery of the shaft 67a of the stopper member 67 and opens/closes an outlet end of the port 68b. Then, although the first compression side check valve 19 separates the annular plate from the partition member 68, opens the port 68b, and hardly gives a resistance to the flow of the hydraulic oil from the reservoir R toward the compression side chamber R2 so as to allow the flow, the first compression side check valve 19 closes the port 68b and maintains the reverse flow of the hydraulic oil.

A stopper member 69 that closes a right end opening portion of the first valve housing 61 is screwed to the inner periphery at the right end of the first valve housing 61 in FIG. 8. The stopper member 69 includes a shaft 69a that is projected into the first valve housing 61, and to an outer periphery of the shaft 69a, an annular partition member 70, the first extension side damping valve 16 including an annular laminated leaf valve laminated on the right side in FIG. 8 of the partition member 70, and the first extension side check valve 17 including an annular plate laminated on the left side in FIG. 8 of the partition member 70 and a spring member that biases the annular plate to the side of the partition member 70 are attached. Then, the partition member 70 has contact with the inner periphery of the first valve housing 61 and partitions the inside of the first valve housing 61 into a space communicating with the port 63a and a space communicating with the port 60b. The space on the right side in FIG. 8 of the partition member 70 communicates with the extension side chamber R1 via the port 63a, inside of the second valve housing 63, the passage 60c, and the annular gap 6 between the cylinder 2 and the outer shell 5, and the space on the left side in FIG. 8 of the partition member 70 communicates with the compression side chamber R2 via the port 60b. Furthermore, the partition member 70 includes ports 70a and 70b that penetrate the partition member 70 in the axial direction, and the space on the left side and the space on the right side in FIG. 8 in the partition member 70 are communicated by the ports 70a and 70b.

The inner periphery of the first extension side damping valve 16 is fixed to the shaft 69a of the stopper member 69, and a deflection of the outer periphery side is allowed. The first extension side damping valve 16 is stacked on the partition member 70 and opens/closes an outlet end of the port 70a. Then, although the first extension side damping valve 16 bends the outer periphery of the port 70a with respect to the flow of the hydraulic oil from the extension side chamber R1 toward the compression side chamber R2, opens the valve, and gives a resistance so as to allow the flow, the first extension side damping valve 16 closes the port 70a and maintains the reverse flow of the hydraulic oil.

The annular plate of the first extension side check valve 17 is slidably attached to the outer periphery of the shaft 69a of the stopper member 69 and opens/closes an outlet end of the port 70b. Then, although the first extension side check valve 17 separates the annular plate from the partition member 70, opens the port 70b, and hardly gives a resistance to the flow of the hydraulic oil from the reservoir R or the compression side chamber R2 toward the extension side chamber R1 so as to allow the flow, the first extension side check valve 17 closes the port 70b and maintains the reverse flow of the hydraulic oil.

A stopper member 71 that closes an upper end opening portion of the second valve housing 63 is screwed to the inner periphery at the upper end of the second valve housing 63 in FIG. 8. Moreover, in the second valve housing 63, a cylindrical sleeve 72, a bottomed cylindrical valve body 73 that is slidably inserted into the sleeve 72, and a spring 74 that is interposed between the sleeve 72 and the valve body 73 and biases the valve body 73 toward the stopper member 71 are housed. Then, the sleeve 72, the valve body 73, and the spring 74 form the switching valve V3, and the switching valve V3 is housed in the second valve housing 63.

The sleeve 72 has an inner diameter that is enlarged in two stages in a way from the front end that is the lower end in FIG. 8 toward the rear end side that is the upper end in FIG. 8, and two step portions 72a and 72b are provided in the inner periphery. An outer periphery at the rear end is fitted into the inner periphery of the second valve housing 63 that is the rear end side than the passage 60c, and the front end has contact with a bottom portion of the front end of the second valve housing 63. Furthermore, a hole 72c is provided on a rear end side than the step portion 72b on the rear end side of the sleeve 72, and the inside of the sleeve 72 communicates with the passage 60c via the hole 72c and communicates with the port 63a. Moreover, on an outer periphery on the rear end side of the sleeve 72, a seal ring 75 is attached that has close contact with the inner periphery of the second valve housing 63 that is between an opening portion of the passage 60c and an opening portion of the port 63b, and this prevents the passage 60c from communicating with the port 63b without through the sleeve 72. Note that the stopper member 71 that closes the opening portion of the second valve housing 63 includes a socket 71a that is fitted into the inner periphery at the rear end of the sleeve 72 and has a hole 71b, and communication between the inside of the sleeve 72 and the port 63b is ensured via the hole 71b.

The valve body 73 has a bottomed cylindrical shape and includes a flange 73a on the outer periphery, an opening portion side than the flange 73a has sliding contact between the step portions 72a and 72b on the inner periphery of the sleeve 72, and an outer periphery of the flange 73a has sliding contact with the inner periphery of the sleeve 72, on the rear end side than the step portion 72b. Furthermore, a hole 73b is provided on a side on the opening portion side than the flange 73a of the valve body 73.

The valve body 73 can move in a direction of entering the sleeve 72 until the flange 73a abuts the step portion 72b of the sleeve 72, and conversely, can move in a direction of exiting from the sleeve 72 until the flange 73a abuts the socket 71a of the stopper member 71.

Then, regarding the valve body 73, at a position where the flange 73a abuts the step portion 72b, since the hole 73b is closed by the inner periphery of the sleeve 72, the communication between the passage 60c and the port 63a is disconnected. On the other hand, the hole 72c of the 129Q sleeve 72 is communicated with the port 63b of the second valve housing 63. Furthermore, in a state where the flange 73a is separated from the step portion 72b and abuts the socket 71a of the stopper member 71, while the valve body 73 disconnects the communication between the port 63a and the port 63b due to the abutment of the flange 73a and the socket 71a, the hole 73b is faced to the hole 72c of the sleeve 72 so as to communicate the passage 60c with the port 63a.

Furthermore, between an open end of the valve body 73 and the step portion 72a of the sleeve 72, the spring 74 formed of a coil spring is interposed in a compressed state. The spring 74 constantly biases the valve body 73 toward the stopper member 71, and when a pressure in a space, communicated with the port 63b, between the valve body 73 and the stopper member 71 is low, the valve body 73 is positioned at a position where the flange 73a abuts the socket 71a of the stopper member 71. In this state, as described above, the communication between the port 63a and the port 63b is disconnected by the abutment of the flange 73a and the socket 71a, and as described above, the port 63b is connected to the pump circuit PC. Therefore, while the connection between the pump circuit PC and the extension side chamber R1 is disconnected, the damper circuit C1 and the extension side chamber R1 are connected by communicating the passage 60c with the port 63a. That is, in this state, the switching valve V3 takes the first position.

When the pump P1 is driven to rotate forward in a state where the switching valve V3 takes the first position, the hydraulic oil is sent from the pump P1 to a space between the valve body 73 and the stopper member 71 via the port 63b, the valve body 73 pushes and compresses the spring 74, the flange 73a abuts the step portion 72b, the port 63b communicates with the passage 60c, and then, the hydraulic oil is supplied from the pump P1 to the extension side chamber R1. In this state, since the communication between the port 63a and the passage 60c configuring the first passage is disconnected by the abutment of the flange 73a and the step portion 72b, the connection between the extension side chamber R1 and the damper circuit C1 is disconnected. That is, the position of the switching valve V3 is switched from the first position to the second position.

Then, when the driving of the pump P1 is stopped after the switching valve V3 takes the second position, since the operation check valve OV in the pump circuit PC is closed, the pressure in the space between the valve body 73 and the stopper member 71 is kept to be high, the flange 73a of the valve body 73 is maintained to abut the step portion 72b of the sleeve 72, and the switching valve V3 maintains the second position.

Thereafter, when the pump P1 is driven to reversely rotate in a state where the switching valve V3 maintains the second position, the operation check valve OV is opened by reversely rotating the pump P1, and the hydraulic oil is discharged from the space between the valve body 73 and the stopper member 71 through the port 63b. Therefore, the valve body 73 is pushed by a biasing force of the spring 74, the flange 73a abuts the socket 71a of the stopper member 71, the communication between the port 63b and the passage 60c is disconnected, and the port 63a configuring the first passage and the passage 60c are communicated. Therefore, the switching valve V3 returns from the second position to the first position and disconnects the connection between the extension side chamber R1 and the pump circuit PC, and connects the extension side chamber R1 and the damper circuit C1.

In a case where the switching valve V3 takes the first position, the damper circuit C1 communicates with the extension side chamber R1 via the port 63a that functions as the first passage and the passage 60c. The damper circuit C1 constantly communicates with the compression side chamber R2 via the port 60b that functions as the third passage. In this state, when the shock absorber main body 1 extends, the hydraulic oil pushed out from the extension side chamber R1 passes through the first extension side damping valve 16 and moves to the enlarged compression side chamber R2. Therefore, the shock absorber D7 with the vehicle height adjustment function illustrated in FIGS. 8 and 9 generates an extension side damping force that prevents the extension of the shock absorber main body 1 when the shock absorber main body 1 extends. Furthermore, in this state, when the shock absorber main body 1 contracts, the hydraulic oil pushed out from the compression side chamber R2 passes through the port 60b and the first compression side damping valve 18 and moves to the reservoir R and moves to the enlarged extension side chamber R1 via the first extension side check valve 17. Therefore, the shock absorber D7 with the vehicle height adjustment function illustrated in FIGS. 8 and 9 generates the extension side damping force that prevents the contraction of the shock absorber main body 1 when the shock absorber main body 1 contracts.

On the other hand, when the pump P1 is rotated forward and the position of the switching valve V3 is switched to the second position, the pump circuit PC communicates with the extension side chamber R1 through the port 63b and the passage 60c, and the communication between the damper circuit C1 and the extension side chamber R1 is disconnected. Then, since the shock absorber main body 1 is contracted by the hydraulic oil supplied from the pump P1 to the extension side chamber R1, the vehicle height is lowered, and when the pump P1 is stopped, the shock absorber main body 1 maintains the contracted state and maintains the vehicle height to be low. Thereafter, if the pump P1 is reversely rotated for a very short time, the switching valve V3 returns to the first position, and the shock absorber main body 1 extends, until the vehicle height becomes the vehicle height before being lowered, by the resilient force of the suspension spring S.

In this way, in a case where the shock absorber D7 with the vehicle height adjustment function illustrated in FIGS. 8 and 9 is in the vehicle height adjustment mode, the vehicle height can be lowered by contracting the shock absorber main body 1 by the forward rotation drive of the pump P1. Note that, in a case where it is desired to increase the vehicle height at the time of the vehicle height adjustment mode, it is sufficient to arrange the second valve housing 63 in the partway in the partition member 68 in the first valve housing 61 and the port 60b for connecting the partition member 70 and the compression side chamber R2, remove the port 63a, connect the passage 60c to the space on the left side than the partition member 68 in the first valve housing 61, and constantly connect the damper circuit C1 to the extension side chamber R1. With this configuration, the shock absorber with the vehicle height adjustment function has the same circuit configuration as the shock absorber D2 with the vehicle height adjustment function. Therefore, the vehicle height can be increased in the vehicle height adjustment mode.

Furthermore, in a case where the damper circuit C2 of the shock absorbers D3 and D4 with the vehicle height adjustment function is adopted, when the outer shell 5 is provided on the outer periphery of the cylinder 2 and the annular gap 6 between the cylinder 2 and the outer shell 5 is communicated with the extension side chamber R1, the damper circuit C2, the switching valve V3, and the reservoir R can be arranged on the bottom side. Therefore, the damper circuit C2, the switching valve V3, and the reservoir R may be provided in the cap 8 that closes the bottom end of the cylinder 2 and the outer shell 5.

Note that, if there is a space, the pump circuit PC, the pump P1, and the motor 21 can be integrated with the cap 8. Although an example has been described where the damper circuits C1 and C2, the switching valve V3, and the reservoir R are provided in the cap 8, the switching valve V1 that is a solenoid switching valve may be provided in the cap 8, instead of the switching valve V3. In that case, the pump passage 20, the motor 21, the pump passage check valve 22, and the pump P may be integrated with the cap 8.

Then, as described above, in a case where the shock absorber main body 1 covers the outer periphery of the cylinder 2 and includes the outer shell 5 forming the annular gap 6 communicating with the extension side chamber R1 between the cylinder 2 and the outer shell 5, and the cap 8 that closes one end of the cylinder 2 and one end of the outer shell 5, and the reservoir R, the damper circuits C1 and C2, and the switching valves V1 and V3 are provided in the cap 8, the reservoir R, the damper circuits C1 and C2, and the switching valve V3 can be integrated in the cap 8. Therefore, assembly of the shock absorber main body 1 becomes easier, and maintenance and tuning become easier because it is possible to access the reservoir R, the damper circuits C1 and C2, and the switching valves V1 and V3 from outside of the shock absorber main body 1.

Furthermore, the first extension side damping valve 16 and the first compression side damping valve 18 (second extension side damping valve 34 and second compression side damping valve 36) in the damper circuit C1 (C2) may be valves that can adjust the damping force, and the damping force can be easily adjusted by providing the first extension side damping valve 16 and the first compression side damping valve 18 (second extension side damping valve 34 and second compression side damping valve 36) in the cap 8. In this way, in the shock absorbers D1 to D7 with the vehicle height adjustment function, the first extension side damping valve 16, the first compression side damping valve 18, the second extension side damping valve 34, and the second compression side damping valve 36 may be damping valves that can adjust the damping force or may be solenoid valves using a solenoid.

Moreover, in a case where the first extension side damping valve 16, the first extension side check valve 17, the first compression side damping valve 18, and the first compression side check valve 19 (second extension side damping valve 34, second extension side check valve 35, second compression side damping valve 36, and second compression side check valve 37) in the damper circuit C1 (C2) are housed in the single cylindrical first valve housing 61, the structure of the cap 8 is not complicated, and the third passage (sixth passage) can be easily installed. Furthermore, when the stopper member 67 that holds the first extension side damping valve 16 and the first extension side check valve 17 (second extension side damping valve 34 and second extension side check valve 35) and the stopper member 69 that holds the first compression side damping valve 18 and the first compression side check valve 19 (second compression side damping valve 36 and second compression side check valve 37) are inserted from the opening portions on the sides of the both ends of the first valve housing 61 so as to face each other, the assembly of the damper circuit C1 (C2) is completed, and accordingly, assemblability becomes excellent. Note that the first valve housing 61 may have a bottomed cylindrical shape, and in that case, it is sufficient to adopt a structure in which the first extension side damping valve 16, the partition member 68, the first extension side check valve 17, the first compression side damping valve 18, the partition member 70, and the first compression side check valve 19 (second extension side damping valve 34, partition member 68, second extension side check valve 35, second compression side damping valve 36, partition member 70, and second compression side check valve 37) are attached to one shaft portion provided in a stopper member screwed and attached to the opening portion of the first valve housing 61. Furthermore, the first valve housing 61 may include a first cylinder that houses the first extension side damping valve 16 and the first extension side check valve 17 (second extension side damping valve 34 and second extension side check valve 35) and a second cylinder that houses the first compression side damping valve 18 and the first compression side check valve 19 (second compression side damping valve 36 and second compression side check valve 37).

The preferred embodiments of the present invention have been described in detail above, but modifications, variations, and alterations can be made without departing from the scope of the claims.

REFERENCE SIGNS LIST 1 shock absorber main body
2 cylinder
3 piston
4 piston rod
5 outer shell
6 annular gap
8 cap
9 relief passage
10, 101, 102 relief valve
13 first passage
14 second passage
15 third passage
16 first extension side damping valve
17 first extension side check valve
18 first compression side damping valve
19 first compression side check valve
31 fourth passage
32 fifth passage
33 sixth passage
34 second extension side damping valve
35 second extension side check valve
36 second compression side damping valve
37 second compression side check valve
23a first position
23b second position
26a left position
26b neutral position
26c right position
C1, C2 damper circuit
D1, D2, D3, D4, D5, D6, D7 shock absorber with vehicle height adjustment function
P, P1 pump
R reservoir
R1 extension side chamber
R2 compression side chamber
S suspension spring
V1, V2, V3 switching valve

The invention claimed is:

1. A shock absorber with a vehicle height adjustment function, the shock absorber comprising:
a shock absorber main body including a cylinder filled with liquid, a piston that is movably inserted into the cylinder and partitions inside of the cylinder into an extension side chamber and a compression side chamber, and a piston rod that is movably inserted into the cylinder and is coupled to the piston;
a suspension spring configured to bias the shock absorber main body in an extending direction;
a reservoir configured to accumulate liquid;
a damper circuit configured to be connected to the extension side chamber, the compression side chamber, and the reservoir and generate a damping force in the shock absorber main body at the time when the shock absorber main body expands/contracts;
a pump configured to be able to suck liquid from the reservoir and discharge the liquid; and
a switching valve configured to be installed between the shock absorber main body and the damper circuit and the pump and be able to switch a damper mode in which the shock absorber main body is connected to the damper circuit so as to generate a damping force in the shock absorber main body and a vehicle height adjustment mode in which the shock absorber main body is connected to the pump, wherein
the reservoir supplies and discharges liquid that is excessive or insufficient in the cylinder at the time of the damper mode and functions as a tank that accumulates liquid to be supplied into the shock absorber main body by driving the pump at the time of the vehicle height adjustment mode.

2. The shock absorber with the vehicle height adjustment function according to claim 1, wherein
in a state of the vehicle height adjustment mode, the switching valve connects the pump to one of the extension side chamber and the compression side chamber of the shock absorber main body and connects another one of the extension side chamber and the compression side chamber to the reservoir via the damper circuit.

3. The shock absorber with the vehicle height adjustment function according to claim 1 or 2, wherein
the damper circuit includes
a first passage of which one end is connected to the extension side chamber,
a second passage that connects another end of the first passage to the reservoir,
a third passage that connects a first connection point that is a connection point between the first passage and the second passage to the compression side chamber,
a first extension side damping valve that is provided in the first passage and gives a resistance to a flow of liquid from the extension side chamber toward the first connection point,
a first extension side check valve that is provided in the first passage in parallel to the first extension side damping valve and allows only a flow of liquid from the first connection point toward the extension side chamber,
a first compression side damping valve that is provided in the second passage and gives a resistance to a flow of liquid from the first connection point toward the reservoir, and
a first compression side check valve that is provided in the second passage in parallel to the first compression side damping valve and allows only a flow of liquid from the reservoir toward the first connection point.

4. The shock absorber with the vehicle height adjustment function according to claim 1 or 2, wherein
the damper circuit includes
a fourth passage of which one end is connected to the extension side chamber,
a fifth passage that connects the compression side chamber to another end of the fourth passage,
a sixth passage that connects a second connection point that is a connection point between the fourth passage and the fifth passage to the reservoir,
a second extension side damping valve that is provided in the fourth passage and gives a resistance to a flow of liquid from the extension side chamber toward the second connection point,
a second extension side check valve that is provided in the fourth passage in parallel to the second extension side damping valve and allows only a flow of liquid from the second connection point toward the extension side chamber, a second compression side damping valve that is provided in the fifth passage and gives a resistance to a flow of liquid from the compression side chamber to the second connection point, and a second compression side check valve that is provided in the fifth passage in parallel to the second compression side damping valve and allows only a flow of liquid from the second connection point toward the compression side chamber.

5. The shock absorber with the vehicle height adjustment function according to claim 3, wherein the switching valve has a position where the first passage is communicated and connection between the pump and the shock absorber main body is disconnected in the damper mode and a position where the first passage is blocked and the pump is connected to the shock absorber main body in the vehicle height adjustment mode, or has a position where the third passage is communicated and the connection between the pump and the shock absorber main body is disconnected in the damper mode and a position where the third passage is blocked and the pump is connected to the shock absorber main body in the vehicle height adjustment mode, or selectively adopts a position where the first passage and the third passage are communicated and the connection between the pump and the shock absorber main body is disconnected in the damper mode and two positions including a position where the first passage is blocked and the pump is connected to the shock absorber main body and a position where the third passage is blocked and the pump is connected to the shock absorber main body, in the vehicle height adjustment mode.

6. The shock absorber with the vehicle height adjustment function according to claim 4, wherein the switching valve has a position where the fourth passage is communicated and connection between the pump and the shock absorber main body is disconnected in the damper mode and a position where the fourth passage is blocked and the pump is connected to the shock absorber main body in the vehicle height adjustment mode, or has a position where the fifth passage is communicated and the connection between the pump and the shock absorber main body is disconnected in the damper mode and a position where the fifth passage is blocked and the pump is connected to the shock absorber main body in the vehicle height adjustment mode, or selectively adopts a position where the fourth passage and the fifth passage are communicated and the connection between the pump and the shock absorber main body is disconnected in the damper mode and two positions including a position where the fourth passage is blocked and the pump is connected to the shock absorber main body and a position where the fifth passage is blocked and the pump is connected to the shock absorber main body, in the vehicle height adjustment mode.

7. The shock absorber with the vehicle height adjustment function according to claim 1, wherein the pump is able to perform bidirectional discharge, and the switching valve is switched to a vehicle height adjustment mode using a discharge pressure of the pump as a pilot pressure.

8. The shock absorber with the vehicle height adjustment function according to claim 1, wherein the shock absorber main body includes a relief passage that connects the extension side chamber to the compression side chamber, and a relief valve that is provided in the relief passage and opens when a differential pressure between the extension side chamber and the compression side chamber reaches a valve opening pressure.

9. The shock absorber with the vehicle height adjustment function according to claim 1, wherein the shock absorber main body includes an outer shell that covers an outer periphery of the cylinder and forms an annular gap communicating with the extension side chamber between the cylinder and the outer shell and a cap that closes one end of the cylinder and one end of the outer shell, and the reservoir, the damper circuit, and the switching valve are provided in the cap.

* * * * *